US011526980B2

(12) United States Patent
Latourte et al.

(10) Patent No.: US 11,526,980 B2
(45) Date of Patent: Dec. 13, 2022

(54) METHOD, DEVICE AND PROGRAM FOR PROCESSING DIFFRACTION IMAGES OF A CRYSTALLINE MATERIAL

(71) Applicants: Electricite de France, Paris (FR); Centre National de la Recherche Scientifique (CNRS), Paris (FR); Ecole Normale Superieure De Cachan, Cachan (FR)

(72) Inventors: Félix Latourte, Cherbourg (FR); Qiwei Shi, Shanghai (CN); François Hild, Chatenay Malabry (FR); Stéphane Roux, Rosny-Sous-Bois (FR)

(73) Assignees: Electricite de France; Centre National de la Recherche Scientifique (CNRS); Ecole Normale Superieure De Cachan

( * ) Notice: Subject to any disclaimer, the term of this patent is extended or adjusted under 35 U.S.C. 154(b) by 252 days.

(21) Appl. No.: 16/771,415

(22) PCT Filed: Dec. 7, 2018

(86) PCT No.: PCT/EP2018/083947
§ 371 (c)(1),
(2) Date: Jun. 10, 2020

(87) PCT Pub. No.: WO2019/115381
PCT Pub. Date: Jun. 20, 2019

(65) Prior Publication Data
US 2020/0349690 A1 Nov. 5, 2020

(30) Foreign Application Priority Data
Dec. 11, 2017 (FR) ...................................... 1761926

(51) Int. Cl.
*G06T 5/00* (2006.01)
*G06T 7/00* (2017.01)
(Continued)

(52) U.S. Cl.
CPC .......... *G06T 7/001* (2013.01); *G01N 23/203* (2013.01); *G01N 23/2251* (2013.01);
(Continued)

(58) Field of Classification Search
CPC ........... G06T 7/001; G06T 5/002; G06T 5/50; G06T 2207/10061; G01N 23/203;
(Continued)

(56) References Cited

U.S. PATENT DOCUMENTS 4,489,425 A * 12/1984 Borgonovi ........... G01N 23/207
378/72
5,353,236 A * 10/1994 Subbiah ................ G01N 23/20
700/266
(Continued)

FOREIGN PATENT DOCUMENTS

| CN | 106198226 A | 12/2016 |
| FR | 3027108 A1 | 4/2016 |
| JP | 2009052993 A | 3/2009 |

OTHER PUBLICATIONS

David, Christoph, "Identification de parametres mecaniques de materiaux composites a partir de correlation d'images numeriques multi-echelles", Materiaux, Ecole des Mines d'Albi-Carmaux, May 6, 2015, https://tel.archives-ouvertes.fr/tel-01149238, English Translation of Abstract Included Only.
(Continued)

*Primary Examiner* — Jose L Couso
(74) *Attorney, Agent, or Firm* — Lerner, David, Littenberg, Krumholz & Mentlik, LLP

(57) ABSTRACT

The invention relates to a method for processing images obtained by a diffraction detector, of a crystalline or polycrystalline material, in which a first image of the material is acquired in a state of reference as well as a second image of the material in a deformed state. The invention is
(Continued)

Figure 1:
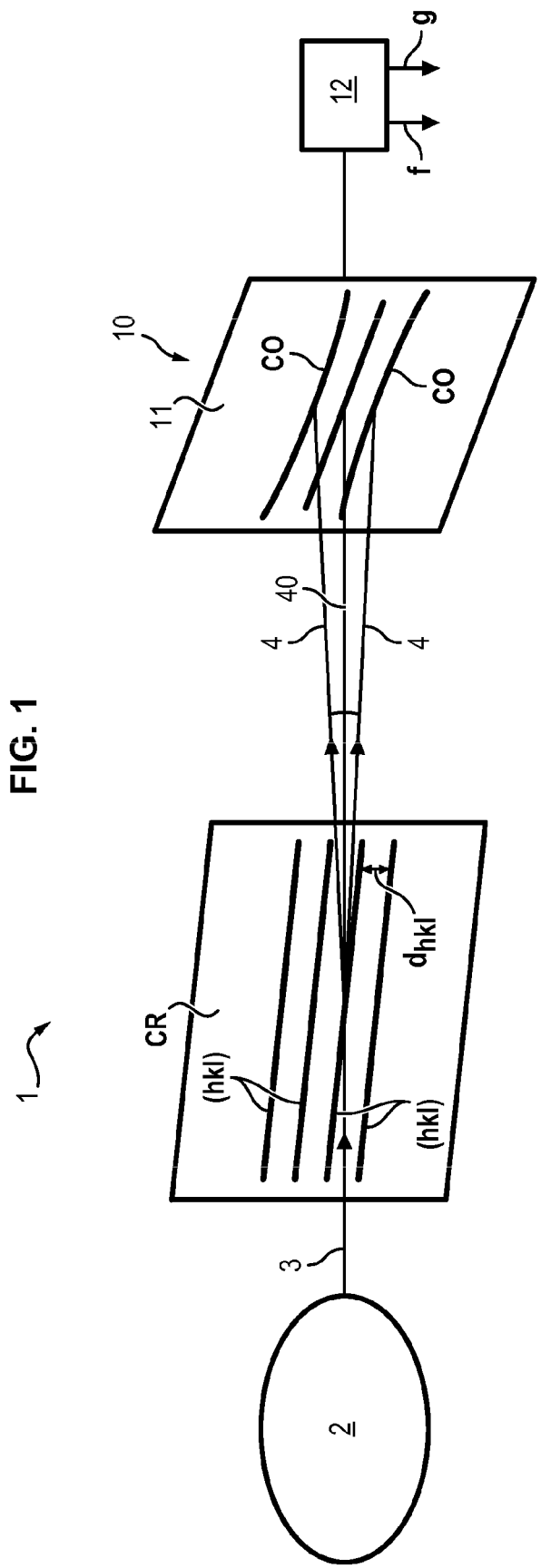

characterised in that, in a calculator, during a first step (E6, E12), a current elastic deformation gradient tensor $F^e$ is given a value determined by calculation, during a second step (E7), the current displacement field induced by the tensor $F^e$ is calculated, during a third step (E8), third digital values of a deformed image ğ(x)=g(x+u(x)) corrected by the current displacement field are calculated, and during an iterative algorithm, iterations of the second and third steps (E12, E7, E8) are carried out on modified values of the tensor r $F^e$ until a convergence criterion is met in relation to the correction to the current value of $F^e$.

15 Claims, 9 Drawing Sheets

(51) Int. Cl.
   *G01N 23/203* (2006.01)
   *G01N 23/2251* (2018.01)
   *G06T 5/50* (2006.01)
(52) U.S. Cl.
   CPC ............... *G06T 5/002* (2013.01); *G06T 5/50* (2013.01); *G01N 2223/0566* (2013.01); *G06T 2207/10061* (2013.01)
(58) Field of Classification Search
   CPC ....... G01N 23/2251; G01N 2223/0566; G01N 2223/606; G01N 2223/607; G01N 23/205; G01N 23/207; G01N 23/255; G01N 2223/056; G01N 23/2055; G01N 23/20; G01N 23/04; G01N 23/20091; G01N 33/385; H01J 2237/226; H01J 2237/221; H01J 37/222; Y10S 117/902
   See application file for complete search history.

(56) References Cited

U.S. PATENT DOCUMENTS

| | | | |
|---|---|---|---|
| 5,466,934 A * | 11/1995 | Adams | G01N 23/203 250/307 |
| 6,326,619 B1 * | 12/2001 | Michael | H01J 37/2955 250/307 |
| 7,091,484 B2 | 8/2006 | Yanagiuchi et al. | |
| 7,442,930 B2 | 10/2008 | Chou | |
| 8,253,099 B2 | 8/2012 | Nicolopoulos et al. | |
| 9,002,499 B2 | 4/2015 | Raghavan et al. | |
| 2003/0139890 A1 * | 7/2003 | Hart | G16C 20/70 702/80 |
| 2003/0162481 A1 | 8/2003 | Antonell et al. | |
| 2003/0168593 A1 * | 9/2003 | Hart | G01N 23/207 250/307 |
| 2006/0029184 A1 * | 2/2006 | Lin | G01N 23/207 378/73 |
| 2006/0231752 A1 * | 10/2006 | Houge | G01N 23/203 250/306 |
| 2010/0158392 A1 | 6/2010 | Adams et al. | |
| 2011/0174972 A1 * | 7/2011 | Duden | H01J 37/20 250/307 |
| 2012/0089349 A1 * | 4/2012 | Bleuet | G01N 23/20 702/42 |
| 2015/0076346 A1 | 3/2015 | Weiss et al. | |
| 2015/0369760 A1 | 12/2015 | Penman et al. | |
| 2017/0167991 A1 | 6/2017 | Schwager | |
| 2017/0343493 A1 | 11/2017 | Reischig | |

OTHER PUBLICATIONS

Dufour et al., "Integrated Digital Image Correlation for the Evaluation and Correction of Optical Distortions", aLaboratoire de Mecanique et Technologie (LMT-Cachan) ENS Cachan / CNRS / UPMC / PRES UniverSud Paris, Cachan Cedex, France, Dec. 19, 2013, pp. 1-38.

International Search Report from Application No. PCT/EP2018/083947 dated Mar. 15, 2019, 2 pages.

Jiang et al., "Deformation compatibility in a single crystalline Ni superalloy", Royal Society of London, Proceedings, Mathematical, Physical and Engineering Sciences, GB, vol. 472, No. 2185, Jan. 13, 2016, pp. 1-24, XP055502792.

Maurice et al., "On solving the orientation gradient dependency of high angular resolution EBSD", Ultramicroscopy, vol. 113, Oct. 2011, pp. 171-181.

Saralaya, Raghavendra, "In-situ Grain Scale Strain Measurements using Digital Image Correlation," Thesis, Drexel University, Jun. 2012, pp. 1-128, XP055502805.

David, Christoph, "Identification de parametres mecaniques de materiaux composites a partir de correlation d'images numeriques multi-echelles", Materiaux, Ecole des Mines d'Albi-Carmaux, May 6, 2015, https://tel.archives-ouvertes.fr/tel-01149238, Partial English Translation provided.

* cited by examiner

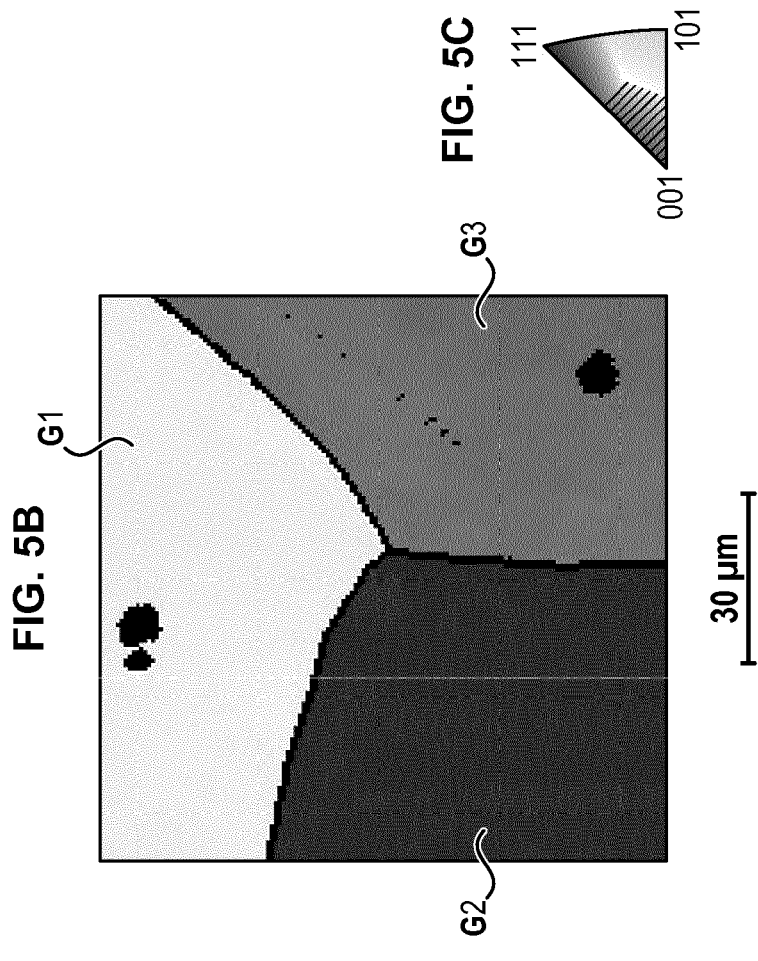
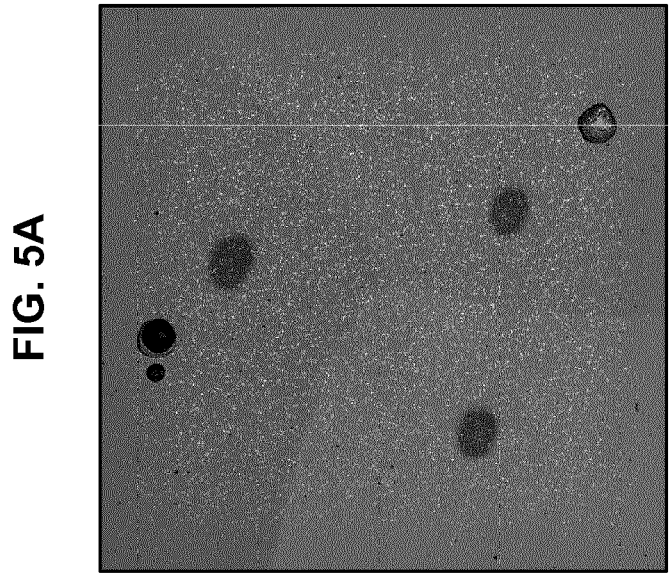

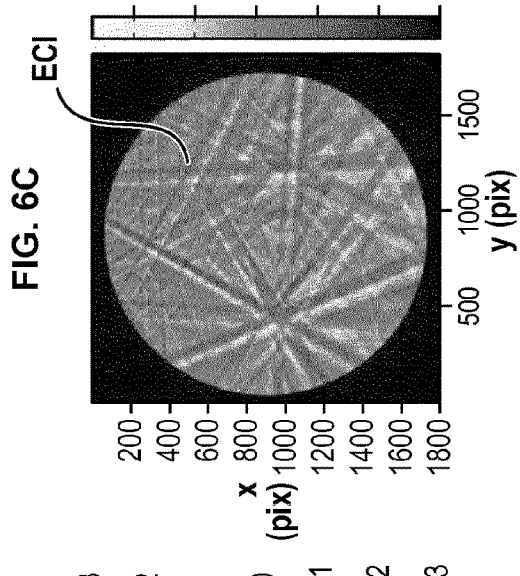
FIG. 6A
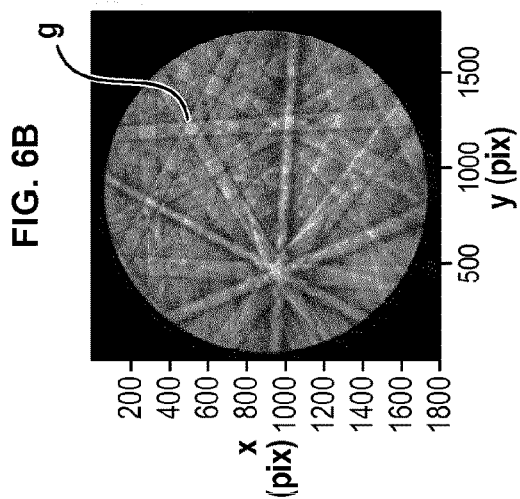
FIG. 6B
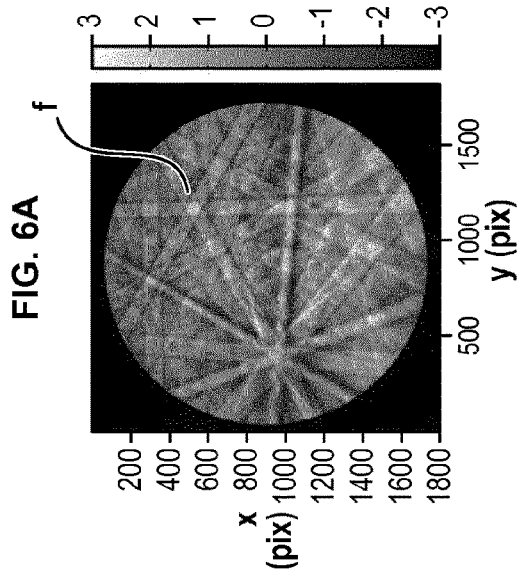
FIG. 6C
FIG. 6D
$$\hat{F}e := \begin{bmatrix} 0.9985 & -0.0342 & 0.0207 \\ 0.0355 & 1.0040 & 0.0050 \\ -0.0181 & -0.0065 & 1.0000 \end{bmatrix}$$
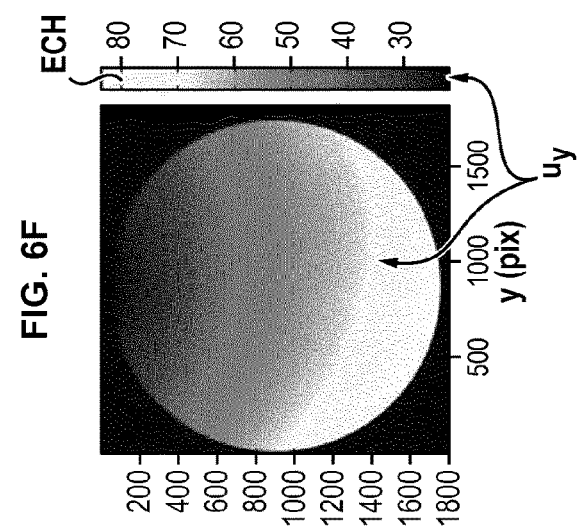
FIG. 6E
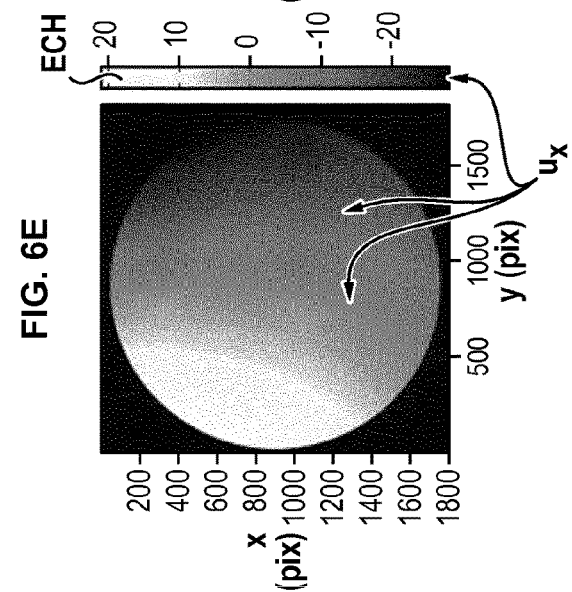
FIG. 6F

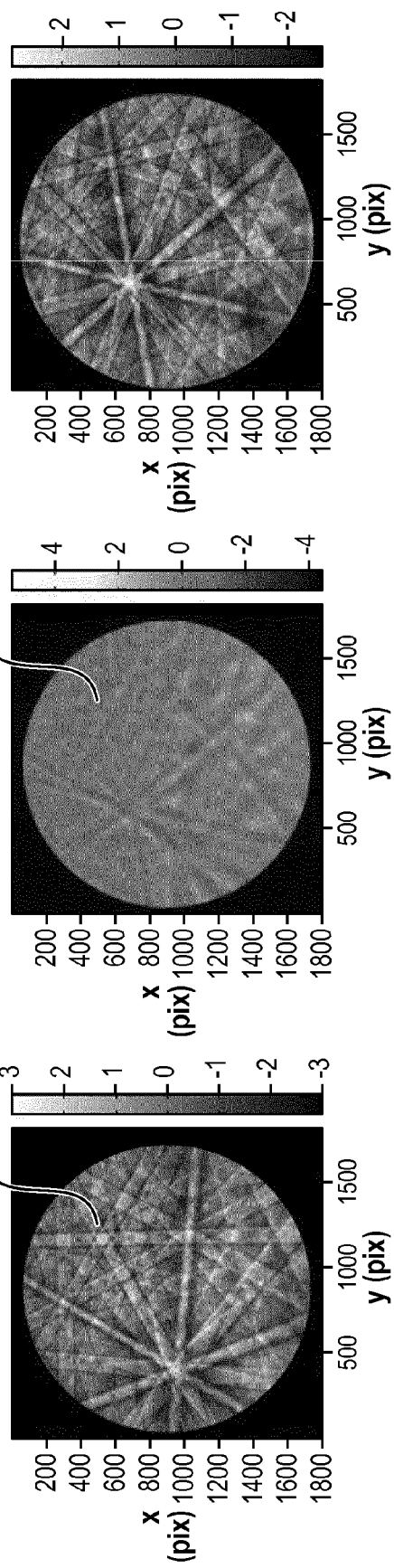

METHOD, DEVICE AND PROGRAM FOR PROCESSING DIFFRACTION IMAGES OF A CRYSTALLINE MATERIAL

CROSS-REFERENCE TO RELATED APPLICATIONS

The present application is a national phase entry under 35 U.S.C § 371 of International Application No. PCT/EP2018/083947 filed Dec. 7, 2018, which claims priority from French Application No. 1761926 filed Dec. 11, 2017, all of which are hereby incorporated herein by reference.

The invention relates to a method for processing images, obtained by a diffraction detector.

The field of application of the invention concerns the analysis of crystalline or polycrystalline materials, and in particular the analysis by High-Resolution Back-Scatter Diffraction (HR-EBSD). In particular, the detector can be an electron diffraction detector producing electron diffraction figures, known as Kikuchi figures, the analysis of which makes it possible to compute the (relative) variations in the crystal unit cell parameters very precisely.

In particular, it is desirable to compare crystal unit cell parameters of one and the same material when it is in different stress states, which affects its parameters. All the information obtained, point by point, during the scanning of the surface of a sample is usually presented in the form of two-dimensional images for different components of the crystallography, or even of the quality of the analysis, or of the degree of confidence granted to it.

It is known from the prior art to compare diffraction figures between two different states using algorithms based on an inter-correlation, for example by the software program called Crosscourt and by the software program called Straincorrelator, also based on the Crosscourt software program. This intercorrelation relies on a division of the images into thumbnails (also known as areas of interest), the movement of which will be tracked in order to obtain a discretized displacement field on the centers of each thumbnail.

This inter-correlation of thumbnails has many drawbacks.

Each thumbnail supplies an average displacement per intercorrelation. For the processing to work, the size of the thumbnail must be large to contain a sufficient number of Kikuchi lines. In order to obtain a rich enough displacement field, it is necessary to take a large number of thumbnails, in practice varying between 25 and 100. Due to this large number and the equally significant size of the thumbnails, considerable overlapping between thumbnails exists. On the one hand, this considerably slows down the correlation processing as the pixels of one and the same thumbnail are taken into account several times. On the other hand, this overlapping introduces high spatial correlations between thumbnails such that the increase in the number of thumbnails, above a certain threshold, makes it possible neither to reduce the measurement uncertainty, nor to reduce systematic bias.

Furthermore, the choice of thumbnail position influences the results obtained, which is a manifestation of the non-optimality of the method used. In the event of relatively large deformations, significant rotations of the patterns can be observed, greater than one degree.

Since the displacement is sought per thumbnail by means of a pure translation, the kinetic database is then only approximate for reproducing the transformation observed on the images. Consequently, the intercorrelation causes significant errors, for example stresses evaluated in the areas of considerable rotation.

The aim of the invention is to obtain a method and a device for processing images which palliate the drawbacks of the prior art by making it possible to compute the displacement field between the images, with a better quality and a lower computation cost.

For this purpose, a first subject matter of the invention is a method for processing images, obtained by a diffraction detector, of a crystalline or polycrystalline material, in which the detector is used to measure:
- a first diffraction image of the material when the material is in a reference state, giving first digital pixel values as a function of two pixel coordinates,
- at least a second diffraction image of the material when the material is in a deformed state with respect to the reference state, the second image giving second digital pixel values as a function of the pixel coordinates (wherein the digital pixel values of the images being may be gray levels or brightness values and in particular being values of the intensity of the diffracted beam at a point of the detector).

According to the invention, in a calculator, a displacement field, for displacing pixels of the first image to pixels of a deformed image, as a function of:
- the two pixel coordinates,
- predetermined coordinates of a center, corresponding to a normal projection, in an image plane of the detector, of a source point of the beam diffracted in the material, and
- components of an elastic deformation gradient tensor is previously stored in a memory.

During a first computing step, the current elastic deformation gradient tensor is made to take a determined value of the elastic deformation gradient tensor.

During a second computing step, the current displacement field is computed from the current elastic deformation gradient tensor and the pixel coordinates of the first image.

During a third computing step, third digital pixel values of a deformed image are computed by correcting the second image at the pixel coordinates to which the current displacement field has been added. Thus, the deformed image is corrected by the current displacement field, and is called the third image or corrected deformed image having third pixel values, to distinguish it from the first and second images.

Over an iterative algorithm, iterations are made of the first, second and third computing steps on modified determined tensor values, until a criterion of convergence on the determined value of the elastic deformation gradient tensor is fulfilled, to compute the corresponding displacement field.

Below is a description of embodiments of the different steps of this method.

Thus, according to an embodiment, the diffraction detector in particular makes it possible to measure a reference configuration of the geometry of the diffraction, associating with the coordinates of each pixel a direction of the diffracted electron beam, and the origin of which corresponds to the normal projection in the image plane of the detector, of the source point of the beam diffracted in the material,
- a first diffraction (Kikuchi) figure of the material when it is in a reference state, giving a so-called reference image, i.e. an image in gray levels, the digital value of which corresponds at each pixel to a density of diffracted electrons in the direction geometrically related to the position of the pixel,
- at least a second diffraction figure when it is in a deformed state with respect to the reference state, this second image giving second digital values of gray levels at each pixel.

According to an embodiment, the displacement field is defined at each pixel, to match the pixels of the first diffraction image to the pixels of the diffraction image of the deformed crystal, in such a way as to make the gray levels of the matched pixels coincide as well as possible, this displacement field thus being associated with a direction of the diffracted beam and taking an algebraic form, the expression of which is a known function of the elastic deformation gradient tensor.

According to an embodiment, during the first computing step, the current elastic deformation gradient tensor is initialized to a predetermined tensor value and is updated over the iterations.

According to an embodiment, during the third computing step, the third digital pixel values of the third deformed image, mentioned above, are computed by interpolating the second image at the pixel coordinates to which the current displacement field has been added.

In the context of the invention, the third pixel values of a deformed image are supplied, which are a correction of the second image, based on a major part of the image, in a shorter time. The computation procured by the invention furthermore reduces the measurement uncertainty of the displacement field between the first image and the second image. The invention is thus specially adapted, in a number of embodiments, to the computation on the basis of the third image, of a deformation of the material between the first image and the second image.

According to an embodiment of the invention, the elastic deformation gradient tensor $\hat{F}^e$ is equal to $$[\hat{F}^e] = \begin{bmatrix} \hat{F}_1^e & \hat{F}_2^e & \hat{F}_3^e \\ \hat{F}_4^e & \hat{F}_5^e & \hat{F}_6^e \\ \hat{F}_7^e & \hat{F}_8^e & 1 \end{bmatrix}$$

where $\hat{F}_1^e, \hat{F}_2^e, \hat{F}_3^e, \hat{F}_4^e, \hat{F}_5^e, \hat{F}_6^e, \hat{F}_7^e, \hat{F}_8^e$ are the components of the elastic deformation gradient tensor $\hat{F}^e$.

According to an embodiment of the invention, the displacement field, $u_x$, $u_y$, for displacing pixels of the first image to pixels of a deformed image, as a function of:
the two pixel coordinates x,y,
the predetermined coordinates x*, y*, z* of the center, corresponding to the normal projection, in the image plane of the detector, of the source point of the beam diffracted in the material, and
the components $\hat{F}_1^e, \hat{F}_2^e, \hat{F}_3^e, \hat{F}_4^e, \hat{F}_5^e, \hat{F}_6^e, \hat{F}_7^e, \hat{F}_8^e$ of the elastic deformation gradient tensor $\hat{F}^e$,
is equal to $$u_x(x, y) = \frac{z^*(\hat{F}_1^e(x-x^*) + \hat{F}_2^e(y-y^*) + \hat{F}_3^e z^*)}{\hat{F}_7^e(x-x^*) + \hat{F}_8^e(y-y^*) + z^*} - (x-x^*)$$

$$u_y(x, y) = \frac{z^*(\hat{F}_4^e(x-x^*) + \hat{F}_5^e(y-y^*) + \hat{F}_6^e z^*)}{\hat{F}_7^e(x-x^*) + \hat{F}_8^e(y-y^*) + z^*} - (y-y^*)$$

According to an embodiment of the invention, the iterative algorithm is carried out by a method of Gauss-Newton type.

According to an embodiment of the invention, over the iterative algorithm, a correction vector $\{\delta\hat{F}^e\}$ is computed verifying the equation $$[M]\{\delta\hat{F}^e\} = \{\gamma\}$$

where [M] is a Hessian matrix of dimension 8×8, having as coefficients $$M_{ij}^{(n-1)} = \sum_{ROI} (\nabla f(x) \cdot \Phi_i(x, \{\hat{F}^e\}))(\nabla f(x) \cdot \Phi_j(x, \{\hat{F}^e\}))$$

where f represents the first pixel values of the first image, x represents the two pixel coordinates (x, y),
$\Phi_i(x; \{\hat{F}^e\})$ is a sensitivity field of the displacement field with respect to the component $\hat{F}_i^e$ of the elastic deformation gradient tensor $\hat{F}^e$ and is equal to the partial derivative of the displacement field with respect to each component $\hat{F}_i^e$ of the elastic deformation gradient tensor $\hat{F}^e$,
$\{\gamma\}$ is a residual vector having as components $$\gamma_i^{(n)} = \sum_{ROI} (f(x) - \tilde{g}^{(n)}(x, \{\hat{F}^e\}))\nabla f(x) \cdot \Phi_i(x, \{\hat{F}^e\}),$$

and
$\tilde{g}^{(n)}(x, \{\hat{F}^e\}) = \tilde{g}_u(x) = g(x+u(x))$ is the third digital value of each pixel in the deformed image and g represents the second pixel values of the second image, the criterion of convergence on the determined tensor value $\hat{F}^e$ being that a norm of the correction vector $\{\hat{F}^e\}$ be less than a specified, nonzero positive bound ($\delta_\epsilon$), the determined tensor value $\{\hat{F}^e\}$ being incremented by the correction vector $\{\delta\hat{F}^e\}$ at each iteration of the first computing step.

According to an embodiment of the invention, the elastic deformation gradient tensor $\hat{F}^e$ has, as components $\hat{F}_i^e$, eight components $\hat{F}_1^e, \hat{F}_2^e, \hat{F}_3^e, \hat{F}_4^e, \hat{F}_5^e, \hat{F}_6^e, \hat{F}_7^e, \hat{F}_8^e$ and a ninth component set to 1, namely according to the following equation:

$$[\hat{F}^e] = \begin{bmatrix} \hat{F}_1^e & \hat{F}_2^e & \hat{F}_3^e \\ \hat{F}_4^e & \hat{F}_5^e & \hat{F}_6^e \\ \hat{F}_7^e & \hat{F}_8^e & 1 \end{bmatrix}$$

the sensitivity field of the displacement field u(x) has as components $\Phi_i(x; \{\hat{F}^e\})$ the components according to the following equations:

$$\Phi_{x1} = \frac{z^*(x-x^*)}{\hat{F}_7^e(x-x^*) + \hat{F}_8^e(y-y^*) + z^*}$$

$$\Phi_{x2} = \frac{z^*(y-y^*)}{\hat{F}_7^e(x-x^*) + \hat{F}_8^e(y-y^*) + z^*}$$

$$\Phi_{x3} = \frac{(z^*)^2}{\hat{F}_7^e(x-x^*) + \hat{F}_8^e(y-y^*) + z^*}$$

$$\Phi_{x4} = 0$$

$$\Phi_{x5} = 0$$

$$\Phi_{x6} = 0$$

$$\Phi_{x7} = -\frac{z^*(x-x^*)(\hat{F}_1^e(x-x^*) + \hat{F}_2^e(y-y^*) + \hat{F}_3^e z^*)}{(\hat{F}_7^e(x-x^*) + \hat{F}_8^e(y-y^*) + z^*)^2}$$

$$\Phi_{x8} = -\frac{z^*(y-y^*)(\hat{F}_1^e(x-x^*) + \hat{F}_2^e(y-y^*) + \hat{F}_3^e z^*)}{(\hat{F}_7^e(x-x^*) + \hat{F}_8^e(y-y^*) + z^*)^2}$$

-continued $$\Phi_{y1} = 0$$

$$\Phi_{y2} = 0$$

$$\Phi_{y3} = 0$$

$$\Phi_{y4} = \frac{z^*(x - x^*)}{\hat{F}^e_7(x - x^*) + \hat{F}^e_8(y - y^*) + z^*}$$

$$\Phi_{y5} = \frac{z^*(y - y^*)}{\hat{F}^e_7(x - x^*) + \hat{F}^e_8(y - y^*) + z^*}$$

$$\Phi_{y6} = \frac{(z^*)^2}{\hat{F}^e_7(x - x^*) + \hat{F}^e_8(y - y^*) + z^*}$$

$$\Phi_{y7} = -\frac{z^*(x - x^*)(\hat{F}^e_4(x - x^*) + \hat{F}^e_5(y - y^*) + \hat{F}^e_6 z^*)}{(\hat{F}^e_7(x - x^*) + \hat{F}^e_8(y - y^*) + z^*)^2}$$

$$\Phi_{y8} = -\frac{z^*(y - y^*)(\hat{F}^e_4(x - x^*) + \hat{F}^e_5(y - y^*) + \hat{F}^e_6 z^*)}{(\hat{F}^e_7(x - x^*) + \hat{F}^e_8(y - y^*) + z^*)^2}$$

According to an embodiment of the invention, the method for processing images is executed for a major part or all of the pixels of the first image and of the second image.

According to an embodiment of the invention, the first and second images are obtained after filtering overexposed pixel values by replacing them with an average of neighboring pixels of these. Aberrant values are thus filtered (noise conventionally defined as "salt-and-pepper" which is involved for certain detectors).

According to an embodiment of the invention, the first and second images are obtained after filtering the pixel values by subtracting global trends of gray level, represented by a second or third order polynomial obtained by a regression process.

According to an embodiment of the invention, the first and second images are obtained after filtering the pixel values by a Gaussian smoothing filter.

According to an embodiment of the invention, the method for processing images is executed for several second images.

According to an embodiment of the invention, at least one out of the following is supplied on an output:
- the elastic deformation gradient tensor, computed as fulfilling the criterion of convergence,
- a residual, computed as being the difference between, on the one hand, the third digital pixel values of the corrected deformed image, having been computed for the corresponding displacement field as fulfilling the criterion of convergence on the determined value of the elastic deformation gradient tensor, and on the other hand the first digital pixel values of the first image,
- a quadratic mean of the residuals computed for several second images respectively,
- the corresponding displacement field, computed as fulfilling the criterion of convergence on the determined value of the elastic deformation gradient tensor,
- a corrected deformed image, corresponding to the third digital pixel values having been computed on the basis of the corresponding displacement field, computed as fulfilling the criterion of convergence.

According to an embodiment of the invention, the first and second images are obtained after subtracting an image background.

A second subject matter of the invention is a device for processing images of a crystalline or polycrystalline material, comprising a diffraction detector making it possible to acquire:
- a first diffraction image of the material when the material is in a reference state, giving first digital pixel values as a function of two pixel coordinates,
- at least a second diffraction image of the material when the material is in a deformed state with respect to the reference state, the second image giving second digital pixel values as a function of the pixel coordinates, characterized in that the device comprises at least a calculator, comprising at least a memory, in which is stored a displacement field, for displacing pixels of the first image to pixels of a deformed image, as a function of:
- the two pixel coordinates,
- predetermined coordinates of a center, corresponding to a normal projection, in an image plane of the detector, of a source point of the beam diffracted in the material, and
- components of an elastic deformation gradient tensor, the calculator being configured for:
- during a first computing step, making the current elastic deformation gradient tensor take a determined value,
- during a second computing step, computing the current displacement field on the basis of the current elastic deformation gradient tensor and of the coordinates for each of the pixels of the first image,
- during a third computing step, computing third digital pixel values of a deformed image by applying the second image to the pixel coordinates to which the current displacement field has been added,
- over an iterative algorithm, making iterations of the first, second and third computing steps on reupdated determined tensor values until a criterion of convergence on the determined value of the elastic deformation gradient tensor is fulfilled, to compute the corresponding displacement field.

A third subject matter of the invention is a computer program, comprising code instructions for implementing the method for processing images of a crystalline or polycrystalline material as described above, when it is executed on a calculator.

Figure 2:
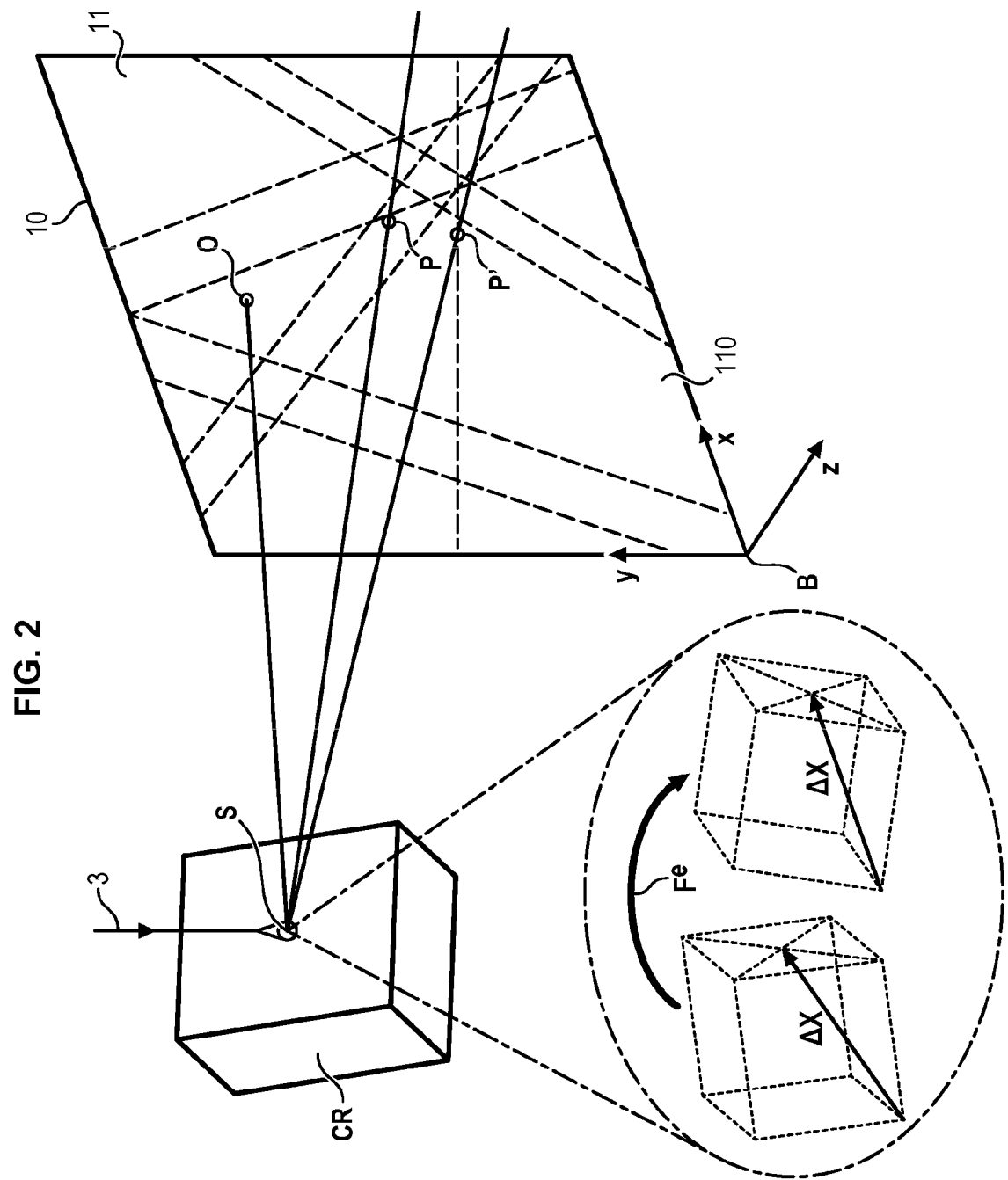
Figure 3:
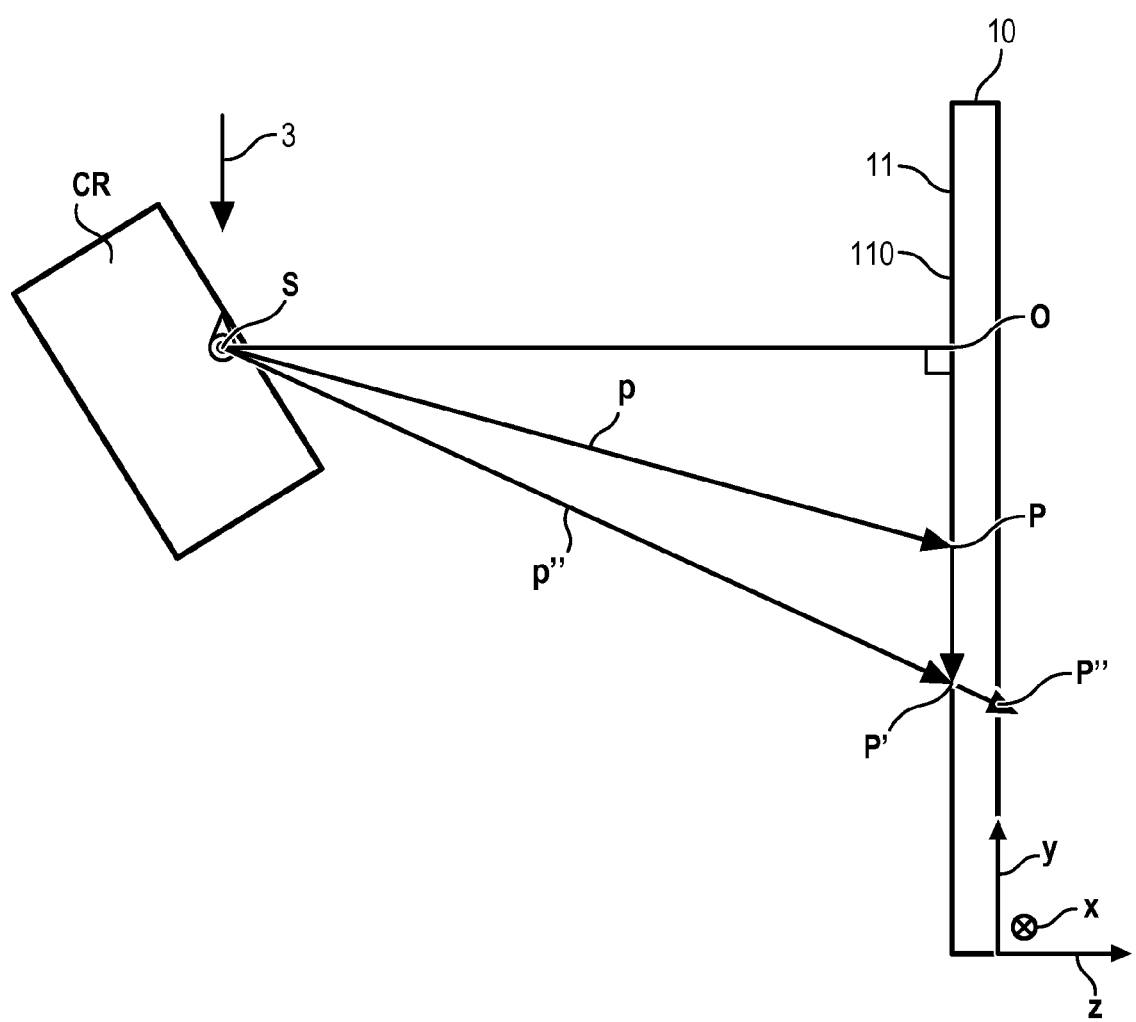
Figure 4:
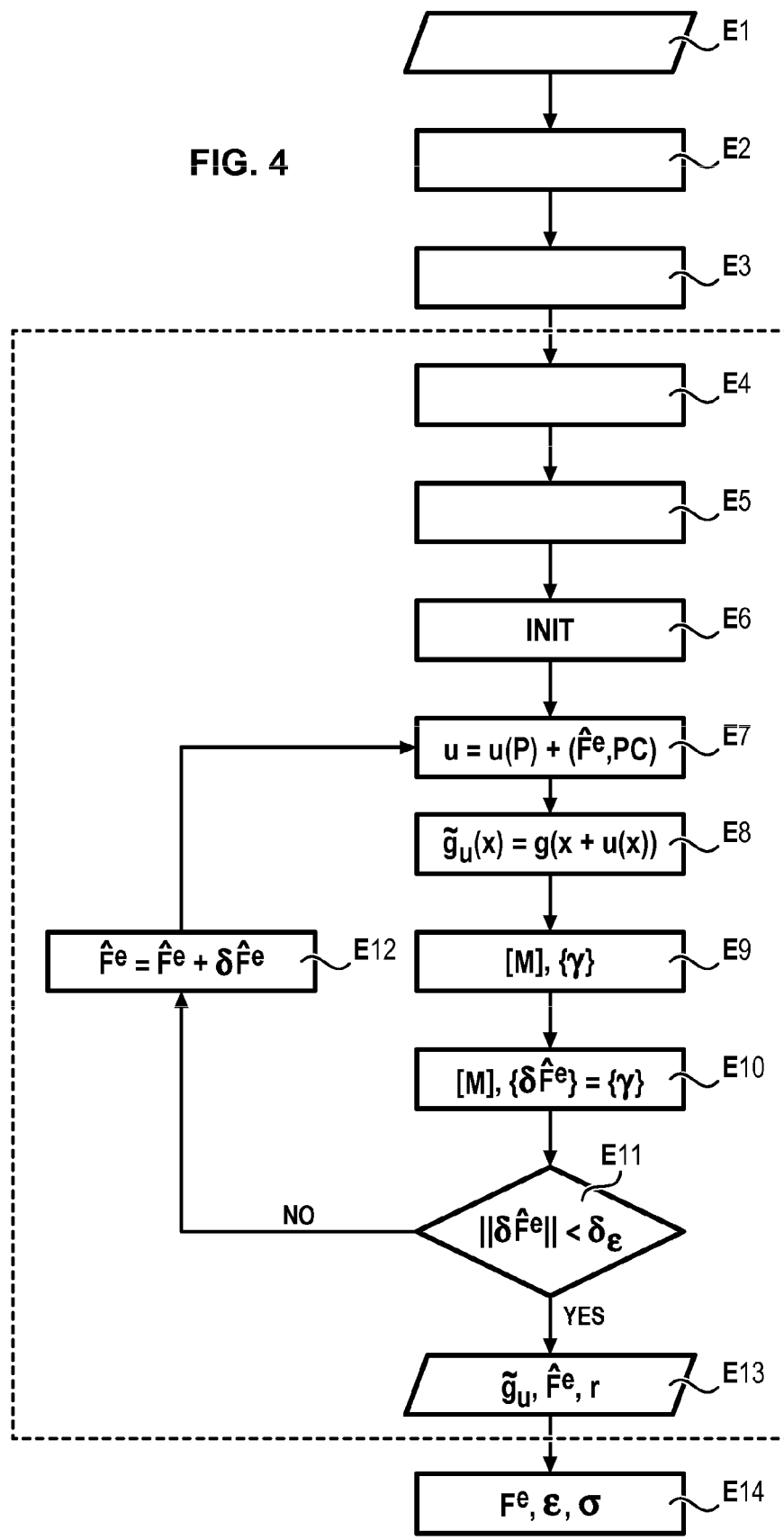
Figures 7A, 7B, 7C, 7D, 7E:
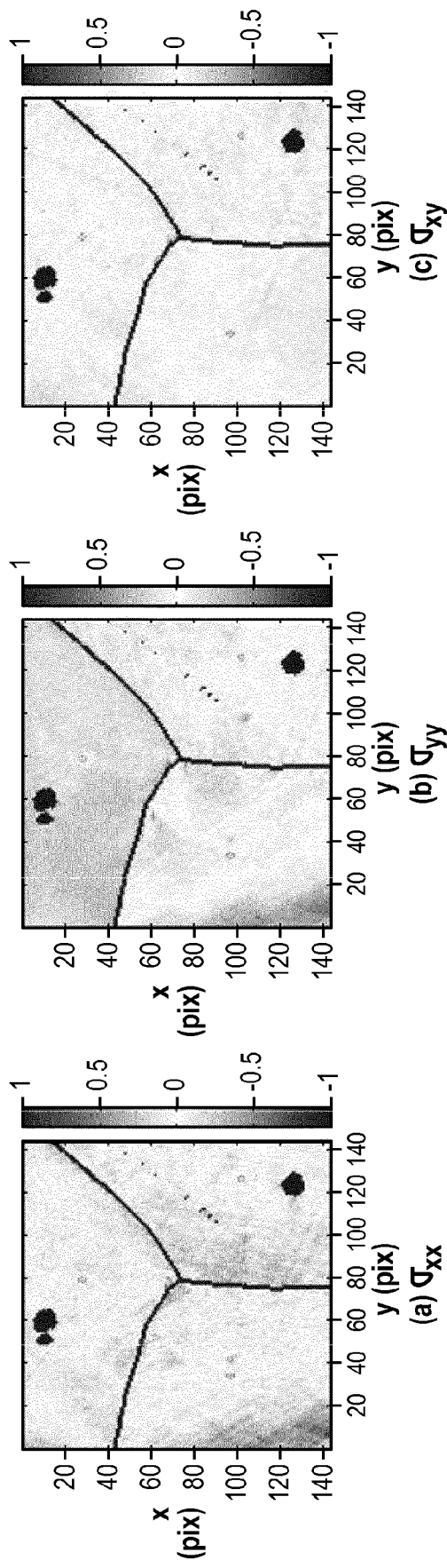
Figure 8A:
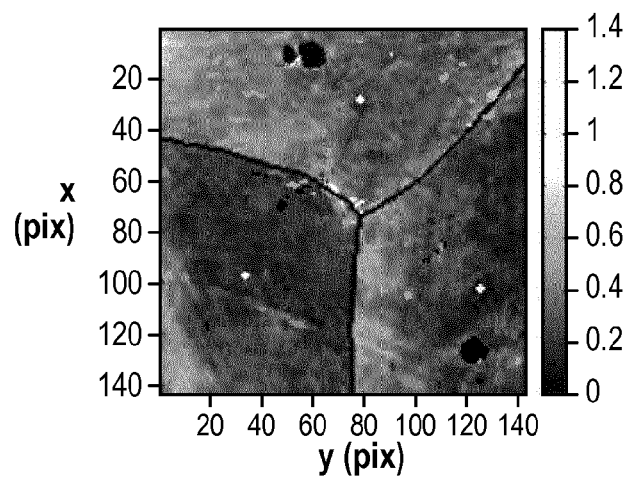
Figure 8B:
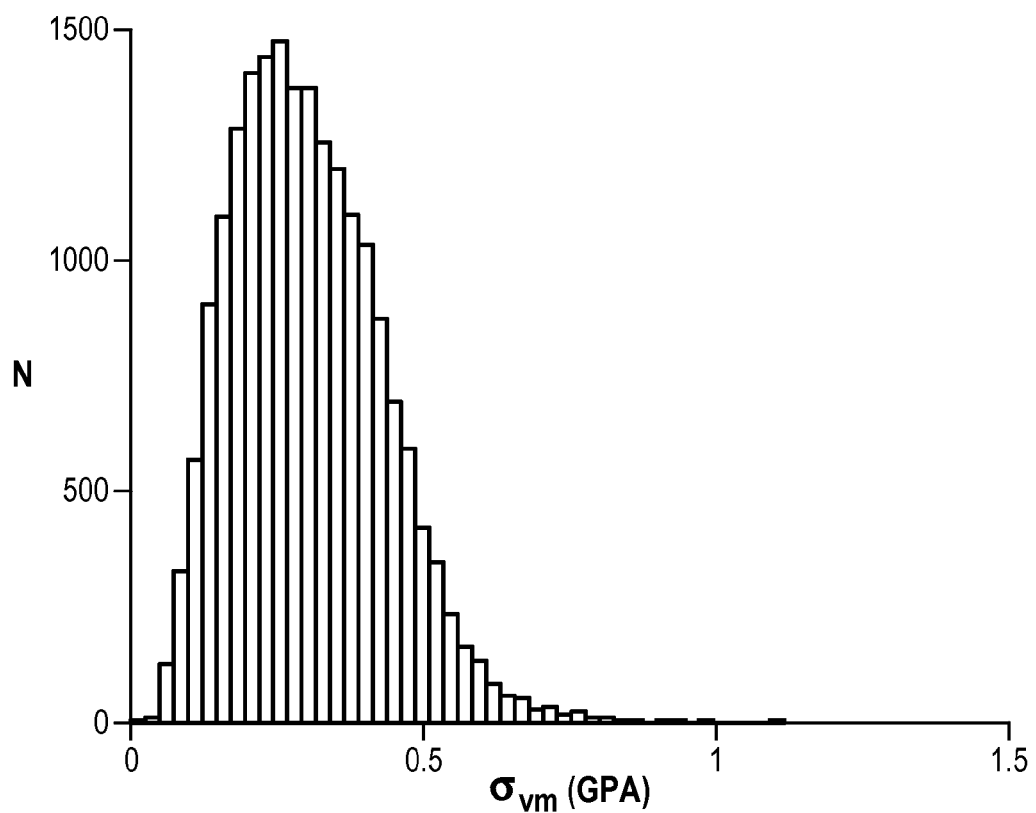

The invention will be better understood on reading the following description, given solely by way of nonlimiting example with reference to the appended drawings, wherein:

FIG. 1 schematically represents a device for acquiring and processing images according to an embodiment of the invention, FIG. 2 schematically represents in perspective the projection of the beams diffracted by a device for processing images according to an embodiment of the invention as well as the effect produced by the elastic deformation gradient tensor on the diffracted beam, FIG. 3 schematically represents in side view the projection of the beams diffracted by a device for processing images according to an embodiment of the invention, FIG. 4 schematically represents a block diagram of the method for processing images according to an embodiment of the invention, FIG. 5A shows an image of a test piece, taken by a scanning electron microscope, FIG. 5B shows an image obtained from FIG. 5A by a software program of the prior art, FIG. 5C shows a color scale of FIG. 5B, FIGS. 6A and 6B show an example of initial diffraction images of a test piece, FIG. 6C represents the difference obtained between the images of FIGS. 6A and 6B, FIG. 6D represents a value computed for an elastic deformation gradient tensor appearing in the method and the device for processing images according to an embodiment of the invention, in the example of FIGS. 6A and 6B, FIGS. 6E, 6F, 6G, 6H and 6I represent images appearing in different steps of the method and the device for processing images according to an embodiment of the invention, in the example of FIGS. 6A and 6B, FIGS. 7A, 7B, 7C, 7D and 7E represent components of a stress tensor obtained by the method and the device for processing images according to an embodiment of the invention, from FIG. 5A onwards, FIG. 8A represents an equivalent von Mises stress obtained by the method and the device for processing images according to an embodiment of the invention, from FIG. 5A onwards, and FIG. 8B represents a histogram of this stress.

In FIG. 1, in the method for processing images according to the invention, during a previous measuring step, a diffraction detector 10 (or sensor 10 or camera 10) is used to obtain digital images (or shots) of a crystalline or polycrystalline material CR. The detector can be a High-Resolution Electron Back-Scattered Diffraction (HR-ESBD) detector. Of course, other types of diffraction detector 10 can be used.

The detector 10 is used to measure a first image f of the material CR being in a reference state, giving first digital pixel values f(x,y) (for example gray levels or otherwise) as a function of the two coordinates x,y of the pixels. The EBSD detector is also used to measure one or more second image(s) g of the material CR being in a deformed state with respect to the reference state. The second image g gives second digital pixel values g(x,y) (for example gray levels) as a function of the two coordinates x,y of the pixels. The images f and g are chosen in step E2 of FIG. 4. In FIGS. 2 and 3, the 3 directions x, y and z are mutually orthonormal.

According to an embodiment of the invention, the deformed state and the reference state are obtained by applying different mechanical stresses to the material CR, for example by applying no mechanical stress to the material CR in the reference state and by applying a determined mechanical stress to the material CR in the deformed state. In this case, provision can be made for means for exerting and/or controlling a mechanical stress on the material CR.

As represented in FIG. 1, the detector 10 is part of a measuring device 1 comprising an internal source 2 of emission of a beam 3 of incident particles and the backscatter diffraction detector 10. The source 2 and the beam 3 of incident particles are positioned with respect to the material CR so that the material CR emits, by interaction of the material CR with the beam 3 of incident particles, one or more beams 4 of diffracted particles. The beam 3 can be or comprise a beam of X-rays, or a beam of electrons, or otherwise. The diffracted beam 4 can also correspond to a diffraction of Kossel type, a diffraction of Laue type or a diffraction in a transmission electron microscope (particularly using TKD, or Transmission Kikuchi Diffraction, performed in a transmission electron microscope.) The detector is positioned with respect to the source 2, to the beam 3 of incident particles and to the material CR, to receive or intercept the beam or beams 4 of diffracted particles, coming from the material CR in response to the beam 3 of incident particles. The detector 10 comprises for example a screen 11 for receiving the beam(s) 4 of diffracted particles. The receiving screen 11 has a determined extent, for example two-dimensional and planar, or otherwise. The receiving screen 11 is connected to a unit 12 for recording and producing images f, g (which can be an automatic computing unit 12) on the basis of the beam(s) 4 of diffracted particles, received or intercepted by the receiving screen 11.

The beam 3 of incident particles can be or contain incident monochromatic radiation of a determined wavelength or several incident monochromatic radiations of different determined wavelengths. The detector 10 can for example be part of an electron microscope, particularly a transmission and/or scanning electron microscope. The screen 11 can for example be a phosphorescent screen, or otherwise.

According to embodiments of the invention, the phenomenon of diffraction of the beam 3 of incident particles by the material CR gives rise on the detector 10 to a Laue diagram in the case where the beam 3 of incident particles is an X-ray beam, and a Kikuchi shot in the case where the beam 3 of incident particles is an electron beam.

According to Bragg's law, the incident monochromatic radiation 3 of wavelength λ will diffract on the crystal planes hkl (or diffracting planes hkl) of the material CR, complying with:

$$n\lambda = 2d_{hkl} \sin \theta \quad (1)$$

where n is the order of diffraction and $d_{hkl}$ the interstitial distance of the planes hkl. The angle θ is the half-angle between the incident beam 3 and the diffracted beam 4. A crystalline material CR, the unit cell of which is described by the frame of reference (a, b, c) has a reciprocal lattice, the frame of reference of which is (a*, b*, c*). By definition, a* is such that a·a*=1, b·a*=c·a*=0. Ditto for b* and c* by circular permutation.

Let $k_i$ the wave vector of the incident beam and $k_f$ the wave vector of the diffracted beam. Since the diffraction is the result of elastic processes (with no energy loss), the norm of the vectors is identical, $|k_f|=|k_i|=\lambda^{-1}$, and therefore $k_f$ describes a circle of radius equal to the norm of $k_i$. The diffraction vector q, defined as:

$$q = k_f - k_i \quad (2)$$

is therefore a vector which, if its origin is positioned at the extremity of the vector $k_i$, then travels on a circle of the same radius 1/λ centered on the origin of the vector $k_i$.

In this same reciprocal space, the Bragg condition can be expressed by the condition of coincidence between the vector $q^{(hkl)}$ of the family of crystal planes hkl, and the diffraction vector q. Only a few favorable directions give rise to coherent diffraction.

According to an embodiment of the invention, the electron beam used in EBSD has a very short wavelength λ and θ is generally less than 2°. The electrons in diffraction condition therefore remain close to the trace of the crystal plane 40 on which they diffract, as represented in FIG. 1.

According to an embodiment of the invention, in the case where the source 2 is divergent, the diffracted beams 4 are distributed over two Kossel cones CO which are symmetrical with respect to the trace of the crystal plane 40. The Kossel cones CO captured by the detector 10 can have the shape of two extremely open hyperbola, as represented in FIG. 1.

According to an embodiment of the invention, the first image f of the reference state and the second image g of the deformed state are obtained during a single acquisition by scanning of the surface of a sample of the material CR. The reference state is then taken at the center of the grain (assumed to be the least stressed) that is then compared with diffraction shots acquired at the periphery of the grain.

According to an embodiment of the invention, in FIGS. 2 and 3, a center O corresponding to the normal projection, in the image plane 110 of the screen 11 of the detector 10, of a source point S of the beam 4 diffracted in the material CR, has two predetermined coordinates (x*, y*) in the plane 110 of the screen 11. The projection of the diffracted beam(s) 4 onto the detector 10 is illustrated in a non-limiting example in FIGS. 2 and 3. The detector 10 is chosen as a reference in the rest of the text. In FIG. 2, the corner B in the bottom left of the planar screen 11 is considered as the origin, the axis x is the horizontal axis in the plane of the screen 110, the axis y is the vertical axis in the plane of the screen 110, and the axis z is the axis normal to the plane of the screen 110. The beam 3 of incident particles is directed onto the test piece with an inclination of 70° with respect to the normal and a "central" point S in the interaction volume of the material CR is considered as the "effective" source of the diffracted electrons 4. The center of projection O is the normal projection (with respect to the plane of the screen 11) of the point S on the plane 110 of the screen 11. Its coordinates are denoted (x*, y*, 0). z* denotes the distance between the source point S and the center O, so S has the coordinates (x*, y*, −z*).

According to an embodiment of the invention, F denotes a deformation gradient tensor according to the equation below which, applied to a current point X in the initial configuration of the reference material CR, makes it possible to obtain its position x in the deformed configuration:

$$[F] = \left[\frac{dx}{dX}\right] = \begin{bmatrix} \frac{\partial x}{\partial X} & \frac{\partial x}{\partial Y} & \frac{\partial x}{\partial Z} \\ \frac{\partial y}{\partial X} & \frac{\partial y}{\partial Y} & \frac{\partial y}{\partial Z} \\ \frac{\partial z}{\partial X} & \frac{\partial z}{\partial Y} & \frac{\partial z}{\partial Z} \end{bmatrix}$$

By way of example, FIG. 1 represents the diffraction of the beam in the microscope chamber, projecting itself onto the screen of the EBSD camera, represented for two crystalline states and the associated transformation gradient tensor for passing from one state to the other. FIG. 3 details the projection, and represents the source point S and the center of projection.

According to an embodiment of the invention, the deformation gradient tensor F is the product of two parts: the elastic part $F^e$ (elastic deformation gradient tensor) and the plastic part $F^p$ according to the following equation:

$$F = F^e F^p$$

According to an embodiment of the invention, the plastic deformation has the effect of making the Kikuchi lines less clear, an effect which is difficult to quantify and which does not permit the measurement of the plastic deformation by the analysis of diffraction images. In the event of hydrostatic elastic deformation, a variation is observed in the width of the Kikuchi lines on the detector. On the contrary, the deviatoric elastic deformation modifies the shape of the crystal lattice, i.e. the relative orientation of the crystal planes, and therefore the angular relationships within the crystal. The projection on a screen distant from the source amplifies the angular separation between two beams and gives rise to a measurable variation between the shots.

According to an embodiment of the invention, as only eight components of $F^e$ are measurable, it is necessary to define a convention setting this missing degree of freedom. According to an embodiment, the single tensor $\hat{F}^e$ is chosen, having eight components $\hat{F}_1^e, \hat{F}_2^e, \hat{F}_3^e, \hat{F}_4^e, \hat{F}_5^e, \hat{F}_6^e, \hat{F}_7^e, \hat{F}_8^e$ and a ninth component set to 1, namely according to the equation below:

$$[\hat{F}^e] = \begin{bmatrix} \hat{F}_1^e & \hat{F}_2^e & \hat{F}_3^e \\ \hat{F}_4^e & \hat{F}_5^e & \hat{F}_6^e \\ \hat{F}_7^e & \hat{F}_8^e & 1 \end{bmatrix}$$

According to an embodiment of the invention, the true elastic deformation gradient is then according to the equation below:

$$F^e = \left(\frac{\partial z}{\partial Z}\right)\hat{F}^e$$

The factor $\partial z/\partial Z$ is not measurable but can be determined by additional hypotheses (such as for example the choice of a planar stress state which is often used).

According to an embodiment of the invention, an element $\Delta X$ is considered in the reference crystal lattice of the material CR. It is assumed that this particular direction gives rise to a diffracted beam 4 which intersects the detector 10 at the point P, of coordinates (x,y,0). In the rest of the text, p denotes the vector SP. This gives $(p)=(\Delta x, \Delta y, \Delta z)^T=(x-x^*, y-y^*, z^*)^T = \alpha \Delta X$, where $\alpha$ is the projection scale.

If the interaction volume around the source point S is subject to an elastic deformation described by the elastic deformation gradient tensor $F^e$, the reference element $\Delta X$ is transformed into $\Delta x = F^e \Delta X$. The diffracted beam 4 initially in the direction p is redirected to the point P", such that $$p'' = \alpha F^e \Delta X$$

where, as previously, the vector SP" is denoted p". The line SP" intersects the detector 10 at the point P'. The apparent displacement u on the detector 10 is u=p'−p (i.e. the vector PP') according to the following equations:

$$u = p' - p$$
$$= \frac{p_z}{p_z''} p'' - p$$
$$= \frac{z^*}{\alpha(F^e \Delta X)_z} \alpha F^e \Delta X - p$$
$$= \frac{z^*}{(F^e p)_z} F^e p - p$$
$$= \frac{z^*}{(\hat{F}^e p)_z} \hat{F}^e p - p$$

A displacement function, giving the displacement field $(u_x, u_y)$ for displacing (or "advecting" or matching) the pixels of the first image f to the pixels of a deformed image g, as a function of:

the two coordinates (x,y),
the two predetermined coordinates x*, y* of the center O, corresponding to the normal projection, in the image plane 110 of the detector 10, of the source point S of the beam diffracted in the material, and
components $\hat{F}_1^e, \hat{F}_2^e, \hat{F}_3^e, \hat{F}_4^e, \hat{F}_5^e, \hat{F}_6^e, \hat{F}_7^e, \hat{F}_8^e$ of the elastic deformation gradient tensor $\hat{F}^e$,
is previously stored in a memory of the unit 12.

Of course, the expression "each of the pixels" or "the pixels" can be replaced by "pixels" to designate a part of the pixels of the image.

According to an embodiment of the invention, the displacement field $(u_x, u_y)$ is equal to, according to the equations (9) below:

$$u_x(x, y) = \frac{z^*\left(\hat{F}_1^e(x-x^*)+\hat{F}_2^e(y-y^*)+\hat{F}_3^e z^*\right)}{\hat{F}_7^e(x-x^*)+\hat{F}_8^e(y-y^*)+z^*} - (x-x^*)$$

$$u_y(x, y) = \frac{z^*\left(\hat{F}_4^e(x-x^*)+\hat{F}_5^e(y-y^*)+\hat{F}_6^e z^*\right)}{\hat{F}_7^e(x-x^*)+\hat{F}_8^e(y-y^*)+z^*} - (y-y^*)$$

The displacement field ($u_x, u_y$) between the first diffraction image f, called the reference image, and the second diffraction image g, called the deformed image, reflects the elastic deformation of the crystal unit cell of the material CR at the studied point.

Below is a description of an algorithm for computing the elastic deformation gradient tensor $\hat{F}^e$. This algorithm can for example be iterative over the steps E7, E8, E9, E10 and E11 described below, as represented in FIG. 4.

The method for processing images is executed by the automatic computing unit 12, such as for example one or more electronic calculator(s) and/or one or more computer(s), and/or one or more processor(s) and/or one or more server(s) and/or one or more machine(s), which can be programmed in advance by a previously stored computer program.

During the first computing step E6, the current elastic deformation gradient tensor $\hat{F}^e$ is made to take a determined value $\hat{F}^e$ of the elastic deformation gradient tensor, such as for example an initial value INIT before the first iteration. According to an embodiment of the invention, this initial value INIT before the first iteration can for example be the identity tensor.

During a second computing step E7, subsequent to the step E6, the current displacement field ($u_x, u_y$) is computed by applying the displacement function dependent on the current elastic deformation gradient tensor $\hat{F}^e$ to the two coordinates x,y for each of the pixels of the first image f. Thus a computation is made of the current displacement field induced by the current elastic deformation gradient tensor at the pixel coordinates of the first image.

During a third computing step E8, subsequent to the step E7, a computation is made of third digital values of a deformed image $\tilde{g}_u(x)=g(x+u(x))$ by applying or interpolating the second image g at the two pixel coordinates to which the current displacement field ($u_x, u_y$) has been added, where x designates the two coordinates x,y of the pixels. The current displacement field ($u_x, u_y$) is thus computed as a function of the current elastic deformation gradient tensor $\hat{F}^e$ and the coordinates for each of the pixels of the first image during the second computing step E8.

According to an embodiment of the invention, a cost function A is computed (see below), on the basis of the quadratic differences, for the major part or all of the pixels, between the third digital pixel values of the deformed image $\tilde{g}_u(x)=g(x+u(x))$, having been computed, and the first digital pixel values f(x) of the first image f, a computation is made of the current elastic deformation gradient tensor $\hat{F}^e$ minimizing the cost function A, computed from the differences, for the major part or all of the pixels, between the third digital pixel values of the deformed image $\tilde{g}_u(x)=g(x+u(x))$, having been computed, and the first digital pixel values f(x) of the first image f.

Over the iterative algorithm, iterations are made of the first, second and third computing steps E7, E8, E9, E10, E11 by modifying at each iteration the determined values of the tensor $\hat{F}^e$ (called the modified determined tensor values $\hat{F}^e$), until the fulfilment of a criterion of convergence on this determined value $\hat{F}^e$ of the elastic deformation gradient tensor, in other words until the fulfillment of a criterion of convergence on the correction at the current value of $\hat{F}^e$. In the step E7 a computation of the displacement field ($u_x, u_y$) corresponding to these determined values of the tensor $\hat{F}^e$ is made by the displacement function.

In the prior art, the global correlation of digital images consists in correlating the two images f and g. According to an embodiment of the invention, the method implements an integrated digital image correlation (CINI). In the case of electron diffraction, the method according to the invention can be named in short ADDICTED for Alternative Dedicated Digital Image Correlation Tailored to Electron Diffraction.

According to an embodiment of the invention, the search for the displacement field ($u_x, u_y$) is made by correcting the deformed image g by the displacement field $\tilde{g}_u(x)=g(x+u(x))$ in the step E8, so as to approach the reference image $\tilde{g}_u(x)=f(x)$ as closely as possible, which is equivalent to minimizing the quadratic norm of the residual $r=(f(x)-\tilde{g}_u(x))$ summed over the entire region of interest (or cost function A), which can be the entire images f and g. In the text below, the deformed image g, having been corrected by the displacement field $\tilde{g}_u(x)=g(x+u(x))$ in the step E8 is called the corrected deformed image $\tilde{g}_u$.

The method for processing images according to the invention can therefore be a method for correcting the second image(s) g and the device for processing images according to the invention can therefore be a device for correcting the second image(s) g.

The cost function A to be minimized is written according to the following equation:

$$A = \sum_{ROI}(f(x)-\tilde{g}_u(x))^2$$

where $\tilde{g}_u(x)=g(x+u(x))$ is the deformed image $\tilde{g}_u$, corrected by the displacement field ($u_x, u_y$) (over the digital resolution algorithm, this will be the current determination) and the minimization of this cost function A will lead to successive corrections of this determination until convergence.

According to an embodiment of the invention, the displacement fields ($u_x, u_y$) (or their corrections) are searched for as linear (or affine) combinations of fields forming a "kinetic database". They are liable to have any medium and then require a global processing of all the kinetics. If in addition the so-called kinetic database comes from a physical model, and is therefore restricted to well-identified mechanisms having a displacement field signature, then it will be called "integrated". The correlation of digital images which results from this is then also described as integrated.

In the case of the ADDICTED method, the CINI is the tool chosen to analyze the diffraction figures (f and g are the respective diffraction figures of the crystalline or polycrystalline reference material CR (stressless for the image f) and of the observed crystal (for the image g). According to an embodiment of the invention, an explanation is given of the way in which the displacement field ($u_x, u_y$) observed in the diffraction figure here depends on the elastic deformation of the material CR diffracting $\hat{F}^e$. Finally, other parameters, P, can affect the measured displacement field ($u_x, u_y$), for example projection parameters P, such as the inclination of the test piece with respect to the sensor 10, the physical size of a pixel and the scanning pitch of the scanning electron microscope, the last two being summarized by the term of beam-induced shift.

According to an embodiment of the invention, the displacement field $(u_x,u_y)$ is explained according to the following equation:

$$u=u(x;\hat{F}^e,P)$$

Finally, generically, these fields can have a nonlinear dependence on $\hat{F}^e$ or P. According to an embodiment of the invention, these dependences are developed around the current determination of the parameters to access an affine expression suitable for the CINI approaches. Thus, according to an embodiment of the invention, one writes according to the following equations:

$$u = u(x; \hat{F}^e + \delta\hat{F}^e, P + \delta P)$$
$$= u(x; \hat{F}^e, P) + \Phi_i(x; \hat{F}^e, P)\delta\hat{F}^e_i +$$
$$= \Psi_j(x; \hat{F}^e, P)\delta P_j$$
$$\Phi_i = \frac{\partial u}{\partial \hat{F}^e_i}$$
$$\Psi_i = \frac{\partial u}{\partial P_i}$$

where $\Phi_i$ corresponds to the sensitivity field with respect to the component $\hat{F}^e_i$ (for i ranging for example from 1 to 8) of the deformation gradient tensor $\hat{F}^e$, and $\Psi_j$ is the sensitivity field with respect to the parameter $P_i$. Thus, for example, $\Phi$ is a matrix of size $(2N_{pixel})\times 8$.

According to an embodiment of the invention, the sensitivity field $\Phi_i(x; \{\hat{F}^e\})$ of the displacement field $u(x)$ has as components the components $\Phi_{xi}(x; \hat{F}^e)$ and $\Phi_{yi}(x; \hat{F}^e)$ according to the following equations:

$$\Phi_{x1} = \frac{z^*(x-x^*)}{\hat{F}^e_7(x-x^*)+\hat{F}^e_8(y-y^*)+z^*}$$

$$\Phi_{x2} = \frac{z^*(y-y^*)}{\hat{F}^e_7(x-x^*)+\hat{F}^e_8(y-y^*)+z^*}$$

$$\Phi_{x3} = \frac{(z^*)^2}{\hat{F}^e_7(x-x^*)+\hat{F}^e_8(y-y^*)+z^*}$$

$$\Phi_{x4} = 0$$

$$\Phi_{x5} = 0$$

$$\Phi_{x6} = 0$$

$$\Phi_{x7} = -\frac{z^*(x-x^*)(\hat{F}^e_1(x-x^*)+\hat{F}^e_2(y-y^*)+\hat{F}^e_3 z^*)}{(\hat{F}^e_7(x-x^*)+\hat{F}^e_8(y-y^*)+z^*)^2}$$

$$\Phi_{x8} = -\frac{z^*(y-y^*)(\hat{F}^e_1(x-x^*)+\hat{F}^e_2(y-y^*)+\hat{F}^e_3 z^*)}{(\hat{F}^e_7(x-x^*)+\hat{F}^e_8(y-y^*)+z^*)^2}$$

$$\Phi_{y1} = 0$$

$$\Phi_{y2} = 0$$

$$\Phi_{y3} = 0$$

$$\Phi_{y4} = \frac{z^*(x-x^*)}{\hat{F}^e_7(x-x^*)+\hat{F}^e_8(y-y^*)+z^*}$$

$$\Phi_{y5} = \frac{z^*(y-y^*)}{\hat{F}^e_7(x-x^*)+\hat{F}^e_8(y-y^*)+z^*}$$

-continued $$\Phi_{y6} = \frac{(z^*)^2}{\hat{F}^e_7(x-x^*)+\hat{F}^e_8(y-y^*)+z^*}$$

$$\Phi_{y8} = -\frac{z^*(y-y^*)(\hat{F}^e_4(x-x^*)+\hat{F}^e_5(y-y^*)+\hat{F}^e_6 z^*)}{(\hat{F}^e_7(x-x^*)+\hat{F}^e_8(y-y^*)+z^*)^2}$$

According to an embodiment of the invention, the iterative algorithm is of Gauss-Newton type. It is, for example, sought to minimize the cost function A iteratively by a Gauss-Newton algorithm.

According to an embodiment of the invention, during the step E8 subsequent to the step E7, a computation is made of $\tilde{g}^{(n)}(x,\hat{F}^e,P)=\tilde{g}_u(x)=g(x+u(x,\hat{F}^e,P))$, which is the third digital pixel value of the corrected deformed image.

According to an embodiment of the invention, during the step E8 subsequent to the step E7, a computation is made of $\tilde{g}^{(n)}(x,\hat{F}^e)=\tilde{g}_u(x)=g(x+u(x,\hat{F}^e))$, which is the third digital pixel value of the corrected deformed image.

According to an embodiment of the invention, over the iterative algorithm, during the step E10 subsequent to the step E9, a correction vector $\{\delta\hat{F}^e\}$ is computed verifying the following equation:

$$[M]\{\delta\hat{F}^e\}=\{\gamma\}$$

where [M] is a Hessian matrix of dimension 8×8. According to an embodiment of the invention, during the step E9 subsequent to the step E8, the coefficients $M_{ij}^{(n-1)}$ of the Hessian matrix [M] are computed according to the following equation:

$$M_{ij}^{(n-1)} = \sum_{ROI}(\nabla f(x) \cdot \Phi_i(x, \{\hat{F}^e\}))(\nabla f(x) \cdot \Phi_j(x, \{\hat{F}^e\}))$$

where f is the pixel values of the reference image and x represents the two coordinates x and y of the pixels. $\Phi_i(x; \{\hat{F}^e\})$ is the sensitivity field of the displacement field $(u_x,u_y)$ with respect to the component $\hat{F}^e_i$ of the elastic deformation gradient tensor $\hat{F}^e$ and is equal to the partial derivative of the displacement field $(u_x,u_y)$ with respect to each component $\hat{F}^e$ of the elastic deformation gradient tensor $\hat{F}^e$. The sensitivity field $\Phi_i(x; \{\hat{F}^e\})$ is therefore a two-dimensional vector, which has a component along x, equal to $\Phi_{xi}(x; \hat{F}^e)$ and a component along y, equal to $\Phi_{yi}(x; \hat{F}^e)$.

$\{\gamma\}$ is the second member of the Newton-Raphson method and is the residual vector having as components $$\gamma_i^{(n)} = \sum_{ROI}(f(x)-\tilde{g}^{(n)}(x, \{\hat{F}^e\}))\nabla f(x) \cdot \Phi_i(x, \{\hat{F}^e\})$$

$\nabla f(x)$ is the gradient of f(x), i.e. of f(x,y).

According to an embodiment of the invention, during the step E9 subsequent to the step E8, the coefficients $\gamma_i^{(n)}$ of the second member $\{\gamma\}$ are computed according to the following equation:

$$\gamma_i^{(n)} = \sum_{ROI}(f(x)-\tilde{g}^{(n)}(x, \{\hat{F}^e\}))\nabla f(x) \cdot \Phi_i(x, \{\hat{F}^e\})$$

According to an embodiment of the invention, the criterion of convergence on the determined tensor value $\hat{F}^e$ is that the norm of the correction vector $\{\delta\hat{F}^e\}$ having been computed is less than a specified, nonzero positive bound $\delta_\epsilon$.

According to an embodiment of the invention, during the step E11 subsequent to the step E10, after each iteration of the steps E7, E8, E9 and E10, an examination is made of whether the norm of the correction vector $\{\hat{F}^e\}$ is less than a specified, nonzero positive bound $\delta_\epsilon$. For example, the bound $\delta_\epsilon$ can be equal to $10^{-7}$ or otherwise. In the case where the norm of the correction vector $\{\delta\hat{F}^e\}$ having been computed is not less than the specified positive bound $\delta_\epsilon$ (NO case of FIG. 4), the updating step E12 described below is executed.

According to an embodiment of the invention, during the computing step E12, the current elastic deformation gradient tensor $\hat{F}^e$ is made to take a determined tensor value $\{\hat{F}^e\}$. For example, during the update computing step E12, the determined tensor value $\{\hat{F}^e\}$ is incremented by the correction vector $\hat{F}^e$, according to the following equation of updating of the determined value $\{\hat{F}^e\}$:

$$\{\hat{F}^e\}=\{\hat{F}^e\}+\{\delta\hat{F}^e\}$$

The step E12 is followed by the first step E7 of computing the following iteration.

According to an embodiment of the invention, in the case where the norm of the correction vector $\{\delta\hat{F}^e\}$ having been computed is less than the specified positive bound $\delta_\epsilon$ (YES case of FIG. 4), the step E13 described below is executed.

According to an embodiment of the invention, in step E13, one takes the determined values of the elastic deformation gradient tensor $\hat{F}^e$ computed during the step E12 of the last iteration, which is that verifying the criterion of convergence, and the displacement field $(u_x,u_y)$ computed during the last step E7, which is computed by the displacement field $(u_x,u_y)$ corresponding to these determined values of tensor $\hat{F}^e$ having been taken.

According to an embodiment of the invention, in step E13, one or more of the following are supplied on an output (which can for example be a display on a screen, and/or storage in a memory, and/or sending on an output port or otherwise):
- the corresponding displacement field $(u_x,u_y)$, computed as fulfilling the criterion of convergence on the determined value $\hat{F}^e$ of the elastic deformation gradient tensor,
- the elastic deformation gradient tensor $\hat{F}^e$, computed as fulfilling the criterion of convergence,
- the corrected image or corrected deformed image $\tilde{g}_u$, corresponding to the deformed image g, having been corrected by the corresponding displacement field $(u_x,u_y)$, computed in the step E8 as fulfilling the criterion of convergence on the determined value $\hat{F}^e$ of the elastic deformation gradient tensor, i.e. the third digital pixel values having been computed on the basis of the corresponding displacement field $(u_x,u_y)$, computed as fulfilling the criterion of convergence on the determined value $\hat{F}^e$ of the elastic deformation gradient tensor,
- a residual field r, computed as being the difference between, on the one hand, the third digital pixel values of the corrected deformed image $\tilde{g}_u$, having been computed for the corresponding displacement field $(u_x,u_y)$ as fulfilling the criterion of convergence on the determined value $\hat{F}^e$ of the elastic deformation gradient tensor, and on the other hand the first digital pixel values $f(x,y)$ of the reference image f,
- a quadratic mean of the residuals r computed for several second images g respectively.

According to an embodiment of the invention, the method is executed for the major part (for example at least 50%, at least 60%, at least 70%, at least 80% or at least 90% of the pixels of the first image f and of the second image g) or all the pixels of the first image f and of the second image g, and this is done in a single pass for each image.

According to an embodiment of the invention, the method is executed for several second images g.

The residual field r collects all the artefacts of the formation and acquisition of the images, and thus potentially contains very rich information from the analyzed images. The signals in the residual which are not white noise often indicate an incomplete exploitation of the information or an unsuitable model of kinetic transformation between images. The residual can therefore contain a signal but also white noise. If it is assumed that the reference image f is formed on the basis of a perfect noiseless reference image $f_p$, superimposed on white noise $b_f$ supposed to be of normal distribution, without spatial correlation, and well-known by the term "Gaussian white noise": then the image f is equal to, according to the following equation:

$$f=f_p+b_f$$

According to an embodiment of the invention, for a series $g^i$ of deformed diffraction images g, each image g' is equal to, according to the following equation:

$$g^i=g_p^i+b_g^i$$

where $b_g^i$ is the pure noise.

After the application of the method according to the invention, this gives, according to the following equation:

$$\tilde{g}^i=\tilde{g}_p^i+\tilde{b}_g^i$$

The residual is then, when the reference image and the deformed image correspond perfectly after the registration (in this case $f_p=\tilde{g}_p^i$), according to the following equations:

$$r^i=f-\tilde{g}^i=f_p-\tilde{g}_p^i+b_f-\tilde{b}_g^i=b_f-\tilde{b}_g^i$$

According to an embodiment of the invention, the same reference image is used within one and the same grain, which therefore corresponds to a single image f, but a multitude of images g. It is then observed that the residuals with convergence obtained for all the images g, can be averaged and, by denoting as $\langle \ldots \rangle$ this average over the different measurement points within a grain, the average of the residuals r is equal to, according to the following equations:

$$\langle r^i \rangle = b_f - \langle \tilde{b}_g^i \rangle = b_f$$

Thus, according to an embodiment of the invention, the average of the residuals r supplies an estimate of the noise $b_f$, and the noise $b_f$ thus computed is subtracted from the reference image $f_p$. This makes it possible to reduce the measurement uncertainties by reducing the residual (variance divided by two).

According to an embodiment of the invention, during the step E5 preceding the step E6, the pixel values $f(x,y)$ of the first image f and the pixel values $g(x,y)$ of the second image g are filtered by a Gaussian filter. A very small-scale Gaussian smoothing of the diffraction image greatly facilitates the subsequent computation, since the raw image is corrupted by a very significant amount of white noise. This Gaussian smoothing consists in convoluting the initial image f (and where applicable g) by a softening function, G $$f=f*G$$

where $G(x,y)$ is chosen as a Gaussian, dependent on an internal length $\xi$, and which is written:

$$G(x, y) = \frac{1}{2\pi\xi^2} e^{-\frac{x^2+y^2}{2\xi^2}}$$

In practice, the chosen length can be of 1 to 2 pixels. This choice depends on the level of noise on the image, itself a function of the acquisition time, the number of pixels, the parameters of the beam, and the material imaged. The Gaussian smoothing effectively eliminates the high-frequency noise of the diffraction image.

According to an embodiment of the invention, in the step E4 preceding the step E5, the pixel values f(x,y) of the first image f and the pixel values g(x,y) of the second image g are filtered by filtering overexposed pixel values by replacing them with an average of neighboring pixels of these. If the phosphorescent screen 110 used to capture the electrons is not uniform, the acquired images f, g often have overexposed pixels at fixed points. These very bright pixels have an adverse effect on the image correlation computation and it is recommended to replace the gray level value of these "bad pixels" with the average gray level of the neighbors.

According to an embodiment of the invention, in the step E4 preceding the step E5, the pixel values f(x,y) of the first image f and the pixel values g(x,y) of the second image g are filtered by filtering these pixel values by subtracting global trends of gray levels, represented by a polynomial of order 2 or 3, obtained by a regression process. Specifically, the images f and g can exhibit global variations in gray level related to fluctuations of the diffracted average energy. For the global image correlation, it is preferable in this case to subtract the global trends of gray levels.

According to an embodiment of the invention, in the step E3 preceding the step E4, an image background, having been computed, is subtracted from the pixel values f(x,y) of the first image f and from the pixel values g(x,y) of the second image g. Specifically, the acquired images f and g can be stained by a background due in particular to the energy distribution of diffracted electrons. This correction by subtracting the background eliminates the average intensity variations of the image, which then makes it possible to increase the contrast and make the Kikuchi lines clearer. For example, in order to achieve this, an acquisition is performed at low magnification of the crystalline or polycrystalline material CR, in order to scan a large number of grains of different orientations. The diffraction images thus acquired are averaged and an estimate of the background can be obtained. In principle, the background image is unique for the entire studied area of an HR-EBSD acquisition.

Of course, in other embodiments of the invention, the order of the steps E3, E4 and E5 could be modified or one or more of these steps E3, E4 and E5 could be deleted. The step E2 can be preceded by an entering step E1 for entering Kikuchi images, the center O and the parameters P. The step E13 can be followed by a post-processing step, for example to obtain other quantities computed on the basis of the quantities obtained in the step E13, such as for example a deformation component E according to the direction y, or otherwise.

According to an embodiment of the invention, the device 1 for processing images of a crystalline or polycrystalline material according to the invention, comprises means for implementing the device 1 for processing images according to the invention. The device 1 for processing images according to the invention comprises the diffraction detector 10 making it possible to acquire:

a first image f of the material being in a reference state, giving first digital pixel values f(x,y) as a function of two pixel coordinates (x,y), one or more second images g of the material being in a deformed state with respect to the reference state, the second image giving second digital pixel values g(x,y) as a function of the pixel coordinates (x,y).

The device 1 for processing images comprises at least a calculator 12, comprising at least a memory, in which is stored a displacement field $(u_x,u_y)$, to make the pixels of the first image change to the pixels of a deformed image, as a function of:

the two pixel coordinates (x,y), predetermined coordinates (x*, y*) of the center O, corresponding to the normal projection, in the image plane of the detector, of the source point S of the beam diffracted in the material, and components $\hat{F}_1^e, \hat{F}_2^e, \hat{F}_3^e, \hat{F}_4^e, \hat{F}_5^e, \hat{F}_6^e, \hat{F}_7^e, \hat{F}_8^e$ of the elastic deformation gradient tensor $\hat{F}^e$.

The calculator 12 is configured to:

during a first computing step E6 or E12, make the current elastic deformation gradient tensor $\hat{F}^e$ take a determined value $\{\hat{F}^e\}$, during a second computing step E7, computing the current displacement field $(u_x,u_y)$ corresponding to the elastic deformation gradient tensor $\{\hat{F}^e\}$ and to the pixel coordinates x,y of the first image f, during a third computing step E8, computing third digital pixel values of a deformed image $\tilde{g}_u(X)=g(x+u(x))$ by correcting the second image g at the pixel coordinates of the current displacement field $(u_x,u_y)$, over an iterative algorithm, making iterations of the first, second and third computing steps E12, E7, E8 on modified determined tensor values $\hat{F}^e$, until the fulfilment of a criterion of convergence on the determined value $\{\hat{F}^e\}$, for computing the corresponding displacement field $(u_x,u_y)$.

The invention also concerns a computer program, comprising code instructions for implementing the method for processing images of a crystalline or polycrystalline material according to the invention, when it is executed on a calculator. The computer program is stored in a memory of the calculator 12.

According to an embodiment of the invention, the first and second images f and g are obtained after correcting a global translation of the images by interpolation of the images, according to the following equation of the corrected images $\hat{f}$ and $\hat{g}$:

$$\hat{g}(x)=g(x+w)$$

$$\hat{f}(x)=f(x+w)$$

where x represents the two coordinates x and y of the pixels of the images. This translation w can be obtained on the basis of a calibration of the detector with a standard test piece and a known direction of scanning with respect to the screen 110 and the physical size of a pixel of the screen 110. Thus, before launching the integrated correlation computation, it is possible to correct beforehand the drift of the images due to the movement of the emission point, i.e. the scanning movement of the electron beam.

According to an embodiment of the invention, the first and second images f and g are obtained after correction by centering on the center of projection O. For example, the test piece (material CR) can be inclined at 70° in the HR-EBSD acquisition position and the screen 110 can also be disoriented by a few degrees. If the acquisition is performed over a large area, the distance z* between the emission point S and the screen can vary. The value of z* has an effect on the magnification of the diffraction image. This effect can be corrected by adjusting the size of the diffraction image centered on the center of projection O=(x*, y*)$^T$ before launching the image correlation, especially when the measured area exceeds 100 μm, according to the following equation of the corrected images ˇf and ˇg:

$$\check{g}(x-x^*) = g^\vee[(z_g^*/z_f^*)(x-x^*)]$$

$$\check{f}(x-x^*) = f[(z_g^*/z_f^*)(x-x^*)]$$

where $z_g^*$ is the distance between the "deformed" image emission point, and $z_f^*$ is that between the reference image emission point. As a consequence, the effect of the projection parameters P on the sensitivity field $\Psi_j$ can be processed and corrected beforehand and the resolution be carried out on the tensor $\hat{F}^e$.

Below is a description by way of nonlimiting example of a test on a polycrystalline traction test piece, with reference to FIGS. 5A, 5B, 5C, 6A to 6I.

The first image f has been produced in the reference state and the second image g in the deformed state of a test piece. To produce the deformed state, the test piece made of coarse-grained AISI 316L stainless steel has been polished and subjected to traction loading inside the chamber of a scanning electron microscope using an in situ test plate. The loading direction is horizontal in FIGS. 5A and 5B. During a first elastic phase of the loading, an HR-EBSD acquisition has been made by considering an area of interest focused on a triple point of the microstructure, i.e. separating three grains G1, G2 and G3. The algorithm according to the invention has been used to process the data.

FIG. 5A shows in an area of interest of the test piece an image made of secondary electrons taken by scanning electron microscope. FIG. 5B shows in the area of interest of the test piece of FIG. 5A an inverse pole figure obtained by standard EBSD analysis. FIG. 6A shows the reference image f obtained at a point of the area of interest, as a function of the coordinates in the plane of the detector, x on the abscissa and y on the ordinate. FIG. 6B shows the second image g of the deformed state, as a function of the coordinates x on the abscissa and the coordinates y on the ordinate. FIG. 6C shows the initial difference ECI between the image of FIG. 6B and the image of FIG. 6A, as a function of the coordinates x on the abscissa and the coordinates y on the ordinate. FIG. 6D shows the elastic deformation gradient tensor $\hat{F}^e$, obtained by the ADDICTED method according to the invention on the basis of the images f and g of FIGS. 6A and 6B. FIG. 6E shows on the gray level scale ECH represented on the right the digital value of the component $u_x$ of the displacement field having been computed on the basis of the images of FIGS. 6A and 6B by the ADDICTED method according to the invention, as a function of the coordinates x on the abscissa and the coordinates y on the ordinate. FIG. 6F shows on the gray level (digital pixel value) scale ECH represented on the right the digital value of the other component $u_y$ of the displacement field having been computed on the basis of images of FIGS. 6A and 6B by the ADDICTED method according to the invention, as a function of the coordinates x on the abscissa and the coordinates y on the ordinate. FIG. 6G shows the deformed and corrected image $\tilde{g}_u$, i.e. having been corrected on the basis of FIG. 6B by the displacement field $(u_x, u_y)$ of FIGS. 6E and 6F, having been computed on the basis of the images of FIGS. 6A and 6B by the ADDICTED method according to the invention as a function of the coordinates x on the abscissa and the coordinates y on the ordinate. FIG. 6H shows the residual field r, equal to the difference between the corrected deformed image $\tilde{g}_u$ of FIG. 6G, obtained by the ADDICTED method according to the invention, and the image f of FIG. 6A. FIG. 6I shows a diffraction image of the grain G3, in which the signals contained in the image 6H are visible.

Between the two images of FIGS. 6A and 6B there is a rotation not easily perceptible to the naked eye but notable when the initial difference between them is computed, as illustrated in FIG. 6C. It can be concluded from FIGS. 6H and 6C that the dominant initial difference illustrated on FIG. 6C disappears owing to the ADDICTED method according to the invention in FIG. 6H and that a field of "phantom" lines becomes visible in the residuals of FIG. 6H.

It is observed that the diffraction image of FIG. 6I exhibits a similarity in the Kikuchi lines with the "phantom" lines present in the residual illustrated in FIG. 6H. This phenomenon indicates that the "background image" has not been acquired in a sufficiently precise and robust manner and that consequently the diffraction signal of the grain G3 is still contained in this image. By interpreting the residual field provided in FIG. 6H by the ADDICTED method according to the invention, it is possible to reveal hitherto hidden information which could be useful for constructing a better background image.

To initialize the very first estimate $\{\hat{F}^e\}$ in the step E6 ((the first "deformed" diffraction image g), the identity matrix is a good choice for the tensor $\hat{F}^e$, due to the small deformations expected, and the absence of additional information. To initialize the tensor on the other pixels in step E6, it is generally preferable to take the value of $\{\hat{F}^e\}$ having been computed for one of its neighbors, since the level of deformation is supposed to be close between neighbor points in the material.

The speed of convergence as a function of the computing conditions is summarized in Table 1 below:

TABLE 1

Number of iterations for different computing conditions

| Gaussian smoothing | Core of 2 pixels | Core of 1 pixel | Unsmoothed |
|---|---|---|---|
| Initialized by tensor $\hat{F}^e$ = identity matrix | 17 | 65 | 700 |
| Initialized by tensor $\hat{F}^e$ of the neighboring pixels | 14 | 50 | 300 |

It can be concluded that Gaussian smoothing of the diffraction image drastically reduces the number of iterations needed to converge and smoothing with a larger core (2 pixels) makes the convergence faster than with a smaller core (1 pixel). The initialization with the estimate of the tensor $\hat{F}^e$ of the neighbor pixels also accelerates convergence especially for computations on the diffraction image unfiltered by the smoothing. In terms of values of the tensor $\hat{F}^e$ obtained, different computing conditions do not lead to identical values of the tensor $\hat{F}^e$ but to values that are fairly close. The standard deviation of the values of the tensor $\hat{F}^e$ obtained is less than $10^{-4}$.

The computations shown below have been carried out on the basis of the image g of the stressed material of FIG. 5A. This image is smoothed with a Gaussian core of 2 pixels and with initialization by the value of the tensor $\hat{F}^e$ of the neighbor pixel. The planar stress hypothesis has been applied to the tensor $\hat{F}^e$, which has therefore been transformed into (treated as) the tensor $F^e$ (elastic part $F^e$ of the deformation gradient tensor F). The emission area (interacting with the electron beam) is of a depth of approximately 25 nm, which makes the planar stress hypothesis legitimate. It should be noted that this planar stress hypothesis is based on the hypothesis that the normal to the surface is well-known, which is in general not the case after deformation. A relief on the surface will degrade the precision of the HR-EBSD measurements. The HR-EBSD acquisition has been carried out at the onset of plasticity and it is thus legitimate to neglect the effect of the relief. It is supposed here that the rotation can be large, but that the pure deformation is small (elastic regime). It is then advisable to keep to a formalism of large transformations on $F^e$, and to compute the rotation R by a polar decomposition, which makes it possible to estimate the straight Green-Lagrange elastic pure deformation tensor $U^e$ related to the stresses according to the following equation:

$$F^e = RU^e$$

Concerning the pure deformations, a hypothesis of small perturbations is legitimate, $\|I-U^e\| \ll 1$, and therefore, the Green-Lagrange deformation tensor is approximately equal to the infinitesimal deformation tensor ε, according to the following equation:

$$U^e \cong I + \varepsilon$$

In the elastic regime, the complete stress tensor σ is computed by Hooke's law, according to the following equation:

$$\sigma = J^{-1} F^e C : \varepsilon (F^e)^T$$

where J is the determinant of $F^e$. The elastic constants are: $C_{11}=206$ GPa, $C_{12}=133$ GPa, $C_{44}=119$ GPa, and are adopted for the Hooke's tensor C assumed to be cubic for the ADDICTED method according to the invention.

The components $\sigma_{xx}$, $\sigma_{yy}$, $\sigma_{xy}$, $\sigma_{yz}$, and $\sigma_{xz}$ of the stress tensor σ obtained by the ADDICTED method according to the invention are respectively represented in FIGS. 7A, 7B, 7C, 7D and 7E as a function of the coordinates x on the abscissa and the coordinates y on the ordinate. The component $\sigma_{zz}$ of the stress tensor σ obtained by the ADDICTED method according to the invention is too small to be distinguished from 0 and is therefore not represented.

Moreover, to verify the planar stress hypothesis, the shear stresses on the free face $\sigma_{iz}$ must approach zero. These shear stresses are small with the ADDICTED method according to the invention, which thus approaches a state of planar stress.

The equivalent von Mises stress obtained by the ADDICTED method according to the invention is represented in FIG. 8A according to the gray scale ECH represented on the right, as a function of the coordinates x on the abscissa and the coordinates y on the ordinate. FIG. 8B represents a histogram of the equivalent von Mises stress of FIG. 8A. The extreme von Mises stress value is 2.7 GPa for the ADDICTED method according to the invention. In terms of computing time, the automatic execution of the method according to the invention, for a program coded in MATLAB, takes 40 hours on a laptop computer using two i7 cores. On a desktop machine running 8 i7 cores, and therefore a more powerful and faster machine, the Cross-Court program takes approximately 40 hours for the first computation only, and 100 hours with the aforementioned remapping. The method according to the invention thus drastically reduces (by 75% or 90%) the computing time with a program in interpreted language, which uses an uncompiled and unoptimized code.

The invention makes it possible to measure the deformations and evaluate the stresses precisely. The invention has the following advantages:

Easy implementation. The pre-rotation operation is intrinsically incorporated into the resolution by the ADDICTED method according to the invention.

Robustness of computation, since a direct measurement is made of the 8 components of the deformation gradient tensor $\hat{F}^e$, by integrating the major part or partically all of the diffraction image. This effect has been verified on degraded Kikuchi images. The exploitation of the images for correlation is done in a complete manner and does not introduce any spatial correlation between neighboring computation points. The physical significance of the result is therefore improved.

The global correlation strategy according to the invention also makes it possible to avoid redundancy in the computations carried out (where the inter-correlation method of the prior art generates overlapping in the thumbnails) and therefore to save considerable computation time (from 75% to 90% according to the test case).

The global correlation strategy reduces the measurement uncertainty. A reduction of 40% has been shown on an easy-to-interpret test case. The strategy takes a large and unique region of interest, i.e. it samples a large number of pixels in one pass. By avoiding the sampling bias intrinsic to intercorrelation, the ADDICTED method according to the invention is optimal vis-á-vis Gaussian white noise affecting diffraction images.

In embodiments, improvements have been proposed, such as for example the application of Gaussian smoothing on the diffraction figure to attenuate the high-frequency noise, or again the initialization of the computation by the results of neighboring element.

In the event of large deformations, the transformation of the images is poorly appraised by the standard correlation of the prior art but is well-described by the formulation according to the invention, based on the projection equation. An increase in precision is therefore obtained, which can be seen in the results in the reduction of extreme stress values.

In embodiments, the correlation residual field is obtained intrinsically by the method according to the invention, whereas it is not computed by the techniques of the prior art and is costly to compute when one wishes to obtain it by these techniques, as it would require a large number of interpolations. In embodiments, by analysis of the residuals of all the computations, it is possible to "denoise" all Kikuchi images, or detect any errors existing in the background noise.

Finally, the ADDICTED method according to the invention, suitable for HR-EBSD images, can be extended to other types of image obtained by diffraction, for example Kossel diffraction, Laue diffraction or TEM (Transmission Electron Microscope) diffraction. These techniques are based on the same principle of projection of diffracted beams. The ADDICTED method according to the invention can be applied to these techniques. The ADDICTED method according to the invention for Laue and TEM diffraction, with all the advantages explained above, provides significant improvements in their exploitation.

Of course, the embodiments, features and examples above can be combined with one another or be selected independently of one another.

The invention claimed is:

1. A method for processing images, obtained by a diffraction detector, of a material being crystalline or polycrystalline, in which the detector is used to measure:
   a first diffraction image of the material when the material is in a reference state, giving first digital pixel values as a function of two pixel coordinates,
   at least a second diffraction image of the material when the material is in a deformed state with respect to the reference state, the second diffraction image giving second digital pixel values as a function of the two pixel coordinates,
   comprising in a calculator,
   previously storing in a memory a displacement field, for displacing pixels of the first diffraction image to pixels of a deformed image, as a function of:
   the two pixel coordinates,
   predetermined coordinates of a center, corresponding to a normal projection, in an image plane of the detector, of a source point of a beam diffracted in the material, and
   components of an elastic deformation gradient tensor,
   during a first computing step, making the elastic deformation gradient tensor to take a determined value of the elastic deformation gradient tensor,
   during a second computing step, computing the displacement field from the elastic deformation gradient tensor and from the two pixel coordinates of the first diffraction image,
   during a third computing step, computing third digital pixel values of a deformed image by correcting the second diffraction image at the two pixel coordinates to which the displacement field has been added,
   over an iterative algorithm, making iterations of the first computing step, of the second computing step and of the third computing step on modified determined tensor values, until a criterion of convergence on the determined value of the elastic deformation gradient tensor is fulfilled, to compute the displacement field.

2. The method as claimed in claim 1, wherein the elastic deformation gradient tensor $\hat{F}^e$ is equal to $$[\hat{F}^e] = \begin{bmatrix} \hat{F}_1^e & \hat{F}_2^e & \hat{F}_3^e \\ \hat{F}_4^e & \hat{F}_5^e & \hat{F}_6^e \\ \hat{F}_7^e & \hat{F}_8^e & 1 \end{bmatrix}$$

where $\hat{F}_1^e, \hat{F}_2^e, \hat{F}_3^e, \hat{F}_4^e, \hat{F}_5^e, \hat{F}_6^e, \hat{F}_7^e, \hat{F}_8^e$ are the components of the elastic deformation gradient tensor $\hat{F}^e$.

3. The method as claimed in claim 1, wherein the displacement field $u_x, u_y$, for displacing pixels of the first diffraction image to pixels of a deformed image, as a function of:
   the two pixel coordinates $x, y$,
   predetermined coordinates $x^*, y^*, z^*$ of the center, corresponding to the normal projection, in the image plane of the detector, of the source point of the beam diffracted in the material, and
   components $\hat{F}_1^e, \hat{F}_2^e, \hat{F}_3^e, \hat{F}_4^e, \hat{F}_5^e, \hat{F}_6^e, \hat{F}_7^e, \hat{F}_8^e$ of the elastic deformation gradient tensor $\hat{F}^e$,
   is equal to $$u_x(x, y) = \frac{z^*(\hat{F}_1^e(x-x^*) + \hat{F}_2^e(y-y^*) + \hat{F}_3^e z^*)}{\hat{F}_7^e(x-x^*) + \hat{F}_8^e(y-y^*) + z^*} - (x-x^*)$$

$$u_y(x, y) = \frac{z^*(\hat{F}_4^e(x-x^*) + \hat{F}_5^e(y-y^*) + \hat{F}_6^e z^*)}{\hat{F}_7^e(x-x^*) + \hat{F}_8^e(y-y^*) + z^*} - (y-y^*).$$

4. The method as claimed in claim 1, wherein the iterative algorithm is carried out by a method of Gauss-Newton type.

5. The method as claimed in claim 1, comprising computing over the iterative algorithm a correction vector $\{\delta \hat{F}^e\}$ verifying the equation $$[M]\{\delta \hat{F}^e\} = \{\gamma\}$$

where $[M]$ is a Hessian matrix of dimension 8×8, having as coefficients $$M_{ij}^{(n-1)} = \sum_{ROI} (\nabla f(x) \cdot \Phi_i(x, \{\hat{F}^e\}))(\nabla f(x) \cdot \Phi_j(x, \{\hat{F}^e\}))$$

where $f$ represents the first digital pixel values of the first diffraction image, $x$ represents the two pixel coordinates $x$ and $y$,
the elastic deformation gradient tensor $\hat{F}^e$ has as components the components $\hat{F}_i^e$,
$\Phi_i(x; \{\hat{F}^e\})$ is a sensitivity field of the displacement field with respect to the component $\hat{F}_i^e$ of the elastic deformation gradient tensor $\hat{F}^e$ and is equal to a partial derivative of the displacement field with respect to each component $\hat{F}_i^e$ of the elastic deformation gradient tensor $\hat{F}^e$,
$\{\gamma\}$ is a residual having as coefficients $$\gamma_i^{(n)} = \sum_{ROI} (f(x) - \tilde{g}^{(n)}(x, \{\hat{F}^e\})) \nabla f(x) \cdot \Phi_i(x, \{\hat{F}^e\}),$$

$\tilde{g}^{(n)}(x, \{\hat{F}^e\}) = \tilde{g}_u(x) = g(x+u(x))$ is the third digital pixel value of each pixel of the deformed image and $g$ represents the second digital pixel values of the second diffraction image,
the criterion of convergence on the determined value of the elastic deformation gradient tensor $\hat{F}^e$ being that a norm of the correction vector $\{\delta \hat{F}^e\}$ be less than a specified, non-zero positive bound,
the determined value $\{\hat{F}^e\}$ being incremented by the correction vector $\{\delta \hat{F}^e\}$ at each iteration of the first computing step.

6. The method as claimed in claim 5, wherein the elastic deformation gradient tensor $\hat{F}^e$ has, as components $\hat{F}_i^e$ eight components $\hat{F}_1^e, \hat{F}_2^e, \hat{F}_3^e, \hat{F}_4^e, \hat{F}_5^e, \hat{F}_6^e, \hat{F}_7^e, \hat{F}_8^e$ and a ninth component set to 1, namely according to the following equation:

$$[\hat{F}^e] = \begin{bmatrix} \hat{F}_1^e & \hat{F}_2^e & \hat{F}_3^e \\ \hat{F}_4^e & \hat{F}_5^e & \hat{F}_6^e \\ \hat{F}_7^e & \hat{F}_8^e & 1 \end{bmatrix}$$

the sensitivity field of the displacement field $u(x)$ has as components $\Phi_i(x; \{\hat{F}^e\})$:

$$\Phi_{x1} = \frac{z^*(x-x^*)}{\hat{F}_7^e(x-x^*) + \hat{F}_8^e(y-y^*) + z^*}$$

-continued $$\Phi_{x2} = \frac{z^*(y-y^*)}{\hat{F}_7^e(x-x^*)+\hat{F}_8^e(y-y^*)+z^*}$$

$$\Phi_{x3} = \frac{(z^*)^2}{\hat{F}_7^e(x-x^*)+\hat{F}_8^e(y-y^*)+z^*}$$

$$\Phi_{x4} = 0$$

$$\Phi_{x5} = 0$$

$$\Phi_{x6} = 0$$

$$\Phi_{x7} = -\frac{z^*(x-x^*)(\hat{F}_1^e(x-x^*)+\hat{F}_2^e(y-y^*)+\hat{F}_3^e z^*)}{(\hat{F}_7^e(x-x^*)+\hat{F}_8^e(y-y^*)+z^*)^2}$$

$$\Phi_{x8} = -\frac{z^*(y-y^*)(\hat{F}_1^e(x-x^*)+\hat{F}_2^e(y-y^*)+\hat{F}_3^e z^*)}{(\hat{F}_7^e(x-x^*)+\hat{F}_8^e(y-y^*)+z^*)^2}$$

$$\Phi_{y1} = 0$$

$$\Phi_{y2} = 0$$

$$\Phi_{y3} = 0$$

$$\Phi_{y4} = \frac{z^*(x-x^*)}{\hat{F}_7^e(x-x^*)+\hat{F}_8^e(y-y^*)+z^*}$$

$$\Phi_{y5} = \frac{z^*(y-y^*)}{\hat{F}_7^e(x-x^*)+\hat{F}_8^e(y-y^*)+z^*}$$

$$\Phi_{y6} = \frac{(z^*)^2}{\hat{F}_7^e(x-x^*)+\hat{F}_8^e(y-y^*)+z^*}$$

$$\Phi_{y7} = -\frac{z^*(x-x^*)(\hat{F}_4^e(x-x^*)+\hat{F}_5^e(y-y^*)+\hat{F}_6^e z^*)}{(\hat{F}_7^e(x-x^*)+\hat{F}_8^e(y-y^*)+z^*)^2}$$

$$\Phi_{y8} = -\frac{z^*(y-y^*)(\hat{F}_4^e(x-x^*)+\hat{F}_5^e(y-y^*)+\hat{F}_6^e z^*)}{(\hat{F}_7^e(x-x^*)+\hat{F}_8^e(y-y^*)+z^*)^2}.$$

7. The method as claimed in claim 1, wherein the method is executed for a major part or all of the pixels of the first diffraction image and of pixels of the second diffraction image.

8. The method as claimed in claim 1, wherein the first diffraction image and the second diffraction images are obtained after filtering overexposed pixel values by replacing them with an average of neighboring pixels of these.

9. The method as claimed in claim 1, wherein the first diffraction image and the second diffraction images are obtained after filtering the first digital pixel values and the second digital pixel values by subtracting global trends of gray level, represented by a polynomial of order 2 or 3 obtained by a regression process.

10. The method as claimed in claim 1, wherein the first diffraction image and the second diffraction images are obtained after filtering the first digital pixel values by a Gaussian smoothing filter.

11. The method as claimed in claim 1, wherein the method is executed for several second digital images.

12. The method as claimed in claim 1, characterized by supplying at least one out of the following on an output:
the elastic deformation gradient tensor, computed as fulfilling the criterion of convergence,
a residual, computed as being a difference between, on the one hand, the third digital pixel values of the deformed image, having been computed for the displacement field as fulfilling the criterion of convergence on the determined value of the elastic deformation gradient tensor, and on the other hand the first digital pixel values of the first diffraction image,
a quadratic mean of the residuals computed for several second images respectively,
the displacement field, computed as fulfilling the criterion of convergence on the determined value of the elastic deformation gradient tensor,
a corrected deformed image, corresponding to the third digital pixel values having been computed based on the displacement field, computed as fulfilling the criterion of convergence.

13. The method as claimed in claim 1, wherein the first diffraction image and the second diffraction images are obtained after subtracting an image background.

14. A device for processing images of a material being crystalline or polycrystalline, comprising a diffraction detector making it possible to acquire:
a first diffraction image of the material when the material is in a reference state, giving first digital pixel values as a function of two pixel coordinates,
at least a second diffraction image of the material when the material is in a deformed state with respect to the reference state, the second diffraction image giving second digital pixel values as a function of the two pixel coordinates,
wherein the device comprises at least a calculator, comprising at least a memory, in which is stored a displacement field, for displacing pixels of the first diffraction image to pixels of a deformed image, as a function of:
the two pixel coordinates,
predetermined coordinates of a center, corresponding to a normal projection, in an image plane of the detector, of a source point of a beam diffracted in the material, and
components of an elastic deformation gradient tensor,
the calculator being configured for:
during a first computing step, making the elastic deformation gradient tensor take a determined value,
during a second computing step, computing the displacement field based on the elastic deformation gradient tensor and of the two pixel coordinates for each of the pixels of the first diffraction image,
during a third computing step, computing third digital pixel values of a deformed image by applying the second diffraction image to the two pixel coordinates to which the displacement field has been added,
over an iterative algorithm, making iterations of the first computing step, of the second computing step and of the third computing steps on reupdated determined tensor values, until a criterion of convergence on the determined value of the elastic deformation gradient tensor is fulfilled, to compute the displacement field.

15. A non-transitory computer readable medium storing thereon a computer program, which when executed by a computer, performs a method for processing images of a crystalline or polycrystalline material as claimed in claim 1.

* * * * *